US008139690B2

(12) United States Patent
Golitschek Edler Von Elbwart et al.

(10) Patent No.: US 8,139,690 B2
(45) Date of Patent: Mar. 20, 2012

(54) METHOD AND TRANSMITTER STRUCTURE REDUCING AMBIGUITY BY REPETITION REARRANGEMENT IN THE BIT DOMAIN

(75) Inventors: Alexander Golitschek Edler Von Elbwart, Darmstadt (DE); Christian Wengerter, Kleinheubach (DE); Isamu Yoshii, Frankfurt (DE)

(73) Assignee: Panasonic Corporation, Osaka (JP)

( * ) Notice: Subject to any disclaimer, the term of this patent is extended or adjusted under 35 U.S.C. 154(b) by 818 days.

(21) Appl. No.: 11/718,495

(22) PCT Filed: Jul. 20, 2005

(86) PCT No.: PCT/EP2005/007928
§ 371 (c)(1),
(2), (4) Date: Oct. 23, 2008

(87) PCT Pub. No.: WO2006/048059
PCT Pub. Date: May 11, 2006

(65) Prior Publication Data
US 2009/0034655 A1    Feb. 5, 2009

(30) Foreign Application Priority Data
Nov. 3, 2004    (EP) ..................................... 04026071

(51) Int. Cl.
H04L 27/12    (2006.01)
(52) U.S. Cl. .......................... 375/340; 375/316; 375/302
(58) Field of Classification Search ................... 375/340
See application file for complete search history.

(56) References Cited

U.S. PATENT DOCUMENTS
6,320,914 B1 * 11/2001 Dent ............................. 375/302
(Continued)

FOREIGN PATENT DOCUMENTS
EP    1293059    3/2003
(Continued)

OTHER PUBLICATIONS
L. Lampe et al., "Iterative Decision-Feedback Differential Demodulation of Bit-Interleaved Coded MDPSK for Flat Rayleigh Fading Channels," IEEE Transactions on Communications, vol. 49, No. 7, Jul. 2001, pp. 1176-1184. p. 3, lines 9-11.

(Continued)

*Primary Examiner* — Kenneth Lam
*Assistant Examiner* — Michael Neff
(74) *Attorney, Agent, or Firm* — Dickinson Wright PLLC

(57) ABSTRACT

A method is provided which improves reliability of channel estimation in a digital communication system by reducing the ambiguity in the recognition of received symbols evaluated for the channel estimation. A first plurality of bits is mapped to a modulation state according to a given Gray mapping of binary numbers to modulation states and transmitted. The plurality of bits is re-transmitted at least once, with a sub-set of bits contained in the plurality of bits inverted, and mapped to further modulation states according to the same Gray mapping. The bits to be inverted are determined in a way that the number of different vector sum results obtainable, for all combinations of bit values within the first plurality of bits, by adding vectors representing complex values of the first and further modulation states in a complex plane, is lower than the number of different modulation states within the Gray mapping.

20 Claims, 20 Drawing Sheets

U.S. PATENT DOCUMENTS

2003/0072286 A1     4/2003   Kim et al.
2005/0226342 A1*   10/2005   Alajaji et al. ................ 375/264

FOREIGN PATENT DOCUMENTS

| EP | 1313250 | 3/2003 |
|----|---------|--------|
| EP | 1313251 | 5/2003 |
| WO | 2004/036817 | 4/2004 |
| WO | 2004/036818 | 4/2004 |

OTHER PUBLICATIONS

International Search Report dated Dec. 19, 2005.
European Search Report dated Apr. 15, 2005.
M. Dottling, et al., "Incremental Redundancy and Bit-Mapping Techniques for High Speed Downlink Packet Access, " IEEE Global Telecommunications Conference, XP010678454, vol. 7, pp. 908-912, Dec. 1, 2003.

* cited by examiner

METHOD AND TRANSMITTER STRUCTURE REDUCING AMBIGUITY BY REPETITION REARRANGEMENT IN THE BIT DOMAIN

BACKGROUND OF THE INVENTION

1. Field of the Invention

The invention relates to digital communication systems. It is particularly applicable to communication systems where data is transmitted over a time-variant or frequency-variant channel, such as in mobile communication systems or satellite communication.

2. Description of the Related Art

For transmission over long distances or wireless links, digital data is modulated onto one or more carriers. Various modulation schemes are known in prior art, such as amplitude shift keying (ASK), phase shift keying (PSK) and mixed amplitude and phase modulation like quadrature amplitude modulation, QAM. In all mentioned modulation types, the modulated signal, in terms of for example voltage or field strength, can be expressed by $$u=(t)=Re(\underline{A} \cdot e^{j\omega t})$$

A bit sequence, or data word, is represented by a complex value $\underline{A}$, wherein $$|\underline{A}|=\sqrt{Re(\underline{A})^2+(Im(\underline{A}))^2}$$

represents the momentary amplitude of the modulated signal and $$\phi(\underline{A})=\arctan(Im(\underline{A})/Re(\underline{A}))$$

represents the momentary phase of the modulated signal. The assignment between values of the bit sequence and complex values is called mapping.

As real transmission channels distort the modulated signal by phase shift and attenuation, and as they add noise to the signal, errors occur in the received data after demodulation. The probability for errors usually rises with rising data rate, that is with rising number of modulation states and falling symbol duration. To cope with such errors, redundancy can be added to the data, which allows to recognise and to correct erroneous symbols. A more economic approach is given by methods which repeat only the transmission of data in which un-correctable errors have occurred, such as hybrid automatic repeat request, HARQ, and incremental redundancy.

EP 1 293 059 B1 shows a method to rearrange digital modulation symbols in order to improve the mean reliabilities of all bits. This is achievable by changing the mapping rule of bits onto symbols. This patent focuses on the rearrangement for retransmitted symbols in an ARQ system.

EP 1 313 250 A1 and EP 1 313 251 A1 give a mechanism how the effect of EP 1 293 059 B1 can be achieved by using the same mapping rule of bits onto symbols and instead manipulating the bits prior to the mapping by interleaving and/or logical bit inversion operations. These methods are also restricted on ARQ systems.

WO 2004 036 817 and WO 2004 036 818 describe how to achieve the reliability averaging effect for a system where an original and a repeated symbol are transmitted over different diversity branches, or in combination with an ARQ system.

The methods and mechanisms of the patent publications cited above will be referred to as "Constellation Rearrangement" or "CoRe" for simplicity.

A major difference between wired communication systems and wireless communication systems is the behaviour of the physical channel over which information is transmitted. The wireless or mobile channel is by its very nature variant over time and/or frequency. For a good performance in most modern mobile communication systems a demodulation of data symbols in a receiver requires an accurate estimation of the channel, usually measured by a channel coefficient, which includes knowledge about the power, the phase, or both properties of the channel. To facilitate this, usually some sort of pilot symbols are inserted into the data symbol stream which have a predetermined unambiguous amplitude and/or phase value, which can be used to determine the channel coefficient. This information is then used for correction measures like adaptive filtering.

"Decision-Feedback Demodulation" is an iterative process where a first rough channel estimate (or none at all) is used to demodulate the data symbols. After demodulation, and preferably after decoding, the obtained information is fed back to the channel estimator for an improved estimation resulting from the data symbols. It should be apparent that this process causes not only delay and requires a lot of computations in each iteration step, but it also depends greatly on the quality of the first rough channel estimate due to the feedback loop. Such procedure is known for example from Lutz H.-J. Lampe and Robert Schober, "Iterative Decision-Feedback Differential Demodulation of Bit-interleaved Coded MDPSK for Flat Rayleigh Fading Channels".

Usually the data symbols themselves cannot be accurately used for channel estimation, since the amplitude and/or phase are not known a priori to demodulation. The receiver has to conclude on a sent symbol based on the received signal, before channel estimation is possible. As the recognition of the symbol might be erroneous, ambiguity is introduced to the channel estimation. This behaviour can be seen from FIG. 1 and is further detailed in Table 1 to show the number of ambiguities involved in different digital modulation schemes.

TABLE 1

Properties of selected digital modulation methods

| Modulation Scheme | Bits per Symbol | Amplitude Ambiguity | Phase Ambiguity |
|---|---|---|---|
| BPSK | 1 | None/1 Level | 2 Levels |
| QPSK | 2 | None/1 Level | 4 Levels |
| 8-PSK | 3 | None/1 Level | 8 Levels |
| 2-ASK/4-PSK | 3 | 2 Levels | 4 Levels |
| 4-ASK/2-PSK | 3 | 4 Levels | 2 Levels |
| 8-ASK | 3 | 8 Levels | None/1 Level |
| 16-PSK | 4 | None/1 Level | 16 Levels |
| 16-QAM | 4 | 3 Levels | 12 Levels |
| 4-ASK/4-PSK | 4 | 4 Levels | 4 Levels |
| 64-QAM | 6 | 9 Levels | 52 Levels |

From Table 1 it follows also easily that the performance of an iterative decision-feedback demodulation scheme will further depend greatly on the number of ambiguities involved in the modulation scheme. A wrong assumption about the sent symbol leads to a wrong result of the channel estimation. Especially in modulation schemes with a high number of modulation states there is a high probability of erroneous symbols due to inevitable noise. A wrong channel estimation, in turn, leads to wrong correction and consequently more errors in received symbols. Therefore there is a need in the related art for improved reliability of the channel estimation.

The above-mentioned prior art addresses only the aspect of averaging the mean bit reliabilities of bits that are mapped onto one digital symbol by rearranging the mappings or by bit operations prior to mapping. While this has a good effect if the time-/frequency-variant channel is known very accurately, it does not provide means to improve the knowledge of the time-/frequency-variant channel at the receiver if the coherence time/frequency is relatively small compared to a data packet.

Gray Mapping or Gray Coding are terms that are widely used in communication systems when digital modulation is used, therefore the description here is very basic. A Gray Mapping is characterized by the fact that the XOR binary operation on the bit sequence of a first symbol and the bit sequence of a nearest-neighbouring second symbol in the complex signal plane has a Hamming weight of 1, i.e. that the results of the XOR results in a binary word which contains the bit value 1 exactly a single time. In other words, in a Gray mapping, bit sequences assigned to closest neighbours differ only in the value of (any) one bit.

Here is one algorithm to convert from "natural binary codes" to Gray code for a one-dimensional arrangement:

Let B[n:0] the array of bits in the usual binary representation (e.g. binary 1101 for decimal 13)
Let G[n:0] the array of bits in Gray code
G[n]=$B[n]$
for i=n−1 down to i=0: G[i]=B[i+1] XOR B[i]

Another recursive generation method is the following:

The Gray code for n bits can be generated recursively by prefixing a binary 0 to the Gray code for n−1 bits, then prefixing a binary 1 to the reflected (i.e. listed in reverse order) Gray code for n−1 bits. This is shown for 1 to 4 bits in FIG. 26.

In two-dimensional arrangement like a mapping of binary numbers to modulation states of a quadrature amplitude modulation (QAM), when the bits of which the numbers consist can be separated into different sub-sets characterising the position with respect to different dimensions, a Gray mapping may be obtained by applying the method above to each of the sub-sets separately. Commonly the result is such that the Gray principle holds in the two-dimensional arrangement only with respect to the nearest neighbour(s) of a constellation point.

SUMMARY OF THE INVENTION

It is therefore an object of the present invention to provide a method which improves the reliability of the channel estimation in a digital transmission system. It is a further object of the present invention to provide a transmitter for a digital communication system which enables improved reliability of the channel estimation.

In one aspect of the present invention, a method for transmitting signals in a digital communication system comprises a) a first mapping step (302) mapping a first plurality of bits to a first modulation state according to a Gray mapping of bit sequences to modulation states; b) a transmission step (303) transmitting said first plurality of bits by modulating a carrier according to said first modulation state; c) at least one inverting step (305), each obtaining at least one further plurality of bits by inverting bits of one subset of said first plurality of bits and keeping bits not comprised within said subset unchanged; d) at least one further mapping step (306) mapping said at least one further plurality of bits to at least one further modulation state according to said Gray mapping of bit sequences to modulation states; e) at least one re-transmission step (307) re-transmitting said first plurality of bits by modulating a carrier according to said at least one further modulation state, wherein in step c) each inverting step inverts all bits comprised within said subset of said first plurality of bits such that a number of different vector sum results (206, 207) obtainable, for all combinations of bit values within said first plurality of bits, by adding vectors representing complex values of said first and further modulation states in a complex plane, is lower than the number of different modulation states within said Gray mapping of binary numbers to modulation states.

In another aspect of the invention, a computer-readable storage medium has stored thereon program instructions that, when executed in a processor of a transmitter of a digital communication system, cause the transmitter to perform the method according to the aspect defined above.

In a further aspect of the invention, a transmitter (2101) for a digital communication system comprises a repeater (2106) for receiving a first plurality of bits and for repeating the received first plurality of bits at least once; an inversion bit determining unit (2108) for determining, for each repeated instance of said first plurality of bits, a subset of bits for inversion; a bit inverter (2109) for inverting all bits of said repeated instance which are comprised within said sub-set determined for said instance, to obtain at least one further plurality of bits comprising said inverted bits and all un-inverted bits of said first plurality of bits; a mapper (2111) for mapping said first and further pluralities of bits to first and further modulation states according to a Gray mapping; and a modulator (2113) for modulating a carrier according to the modulation states, wherein said inversion bit determining unit is configured to determine said at least one subset of said first plurality of bits for inversion such that a number of different vector sum results obtainable, for all combinations of bit values within said first plurality of bits, by adding vectors representing complex values of said first and further modulation states in a complex plane is lower than a number of different modulation states within said Gray mapping of binary numbers to modulation states.

According to still another aspect of the invention, a base station (2200) of a digital wireless communication system comprises the transmitter (2101) as defined in the previous aspect.

According to still a further aspect of the invention, a mobile station (2300) of a digital wireless communication system comprises the transmitter (2101) as defined in the aspect further above.

BRIEF DESCRIPTION OF THE DRAWINGS

The accompanying drawings are incorporated into and form a part of the specification for the purpose of explaining the principles of the invention. The drawings are not to be understood as limiting the invention to only the illustrated and described examples of how the invention can be made and used. Further features and advantages will become apparent from the following and more particular description of the invention, as illustrated in the accompanying drawings, wherein

FIG. 6 shows steps for determining bits to be inverted for re-transmission with ASK;

FIG. 8 shows steps for determining bits to be inverted for re-transmission with mixed ASK/PSK;

DETAILED DESCRIPTION OF THE INVENTION

Figure 1:
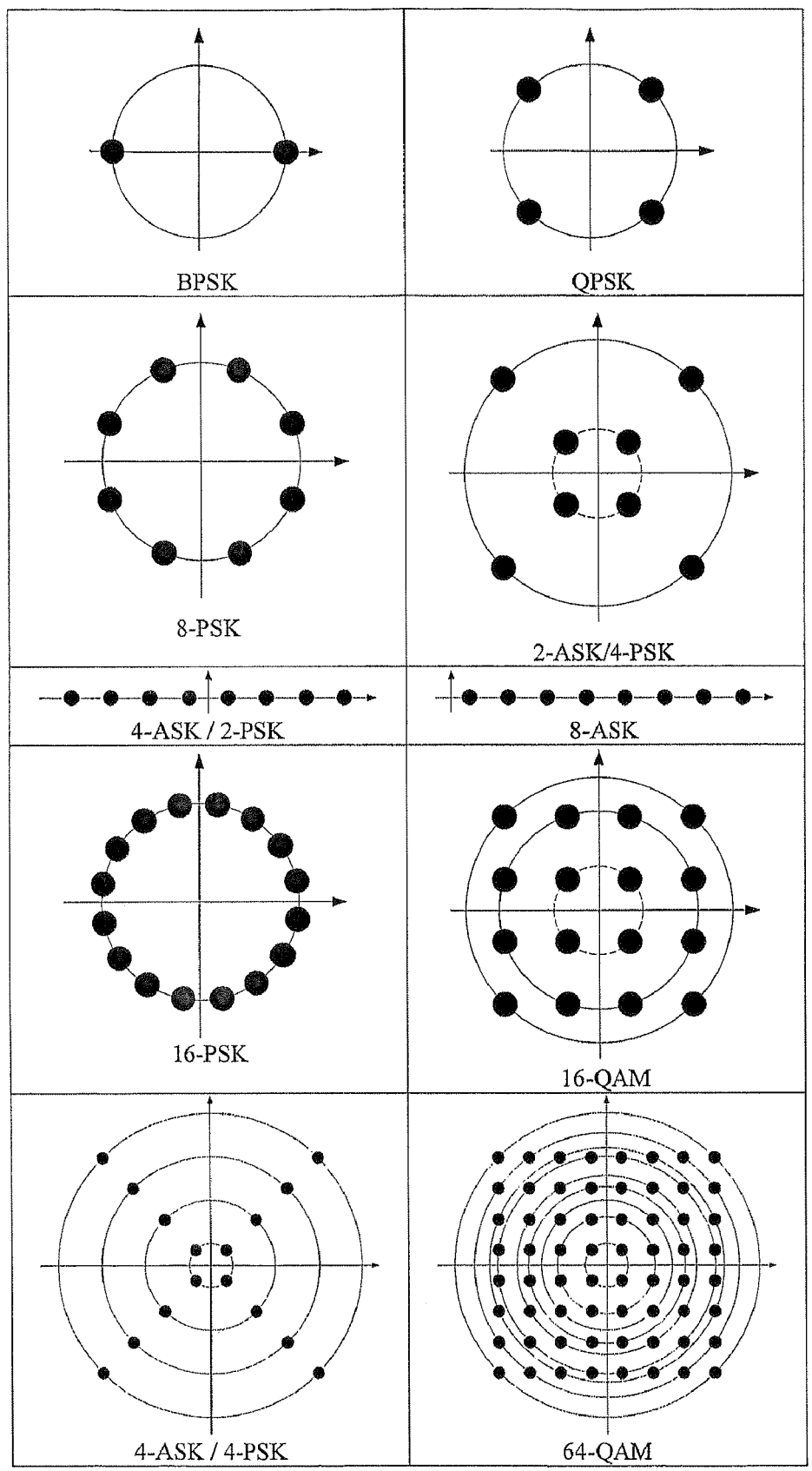
FIG. 1 illustrates examples for digital modulation mappings in the complex signal plane.
Figure 2:
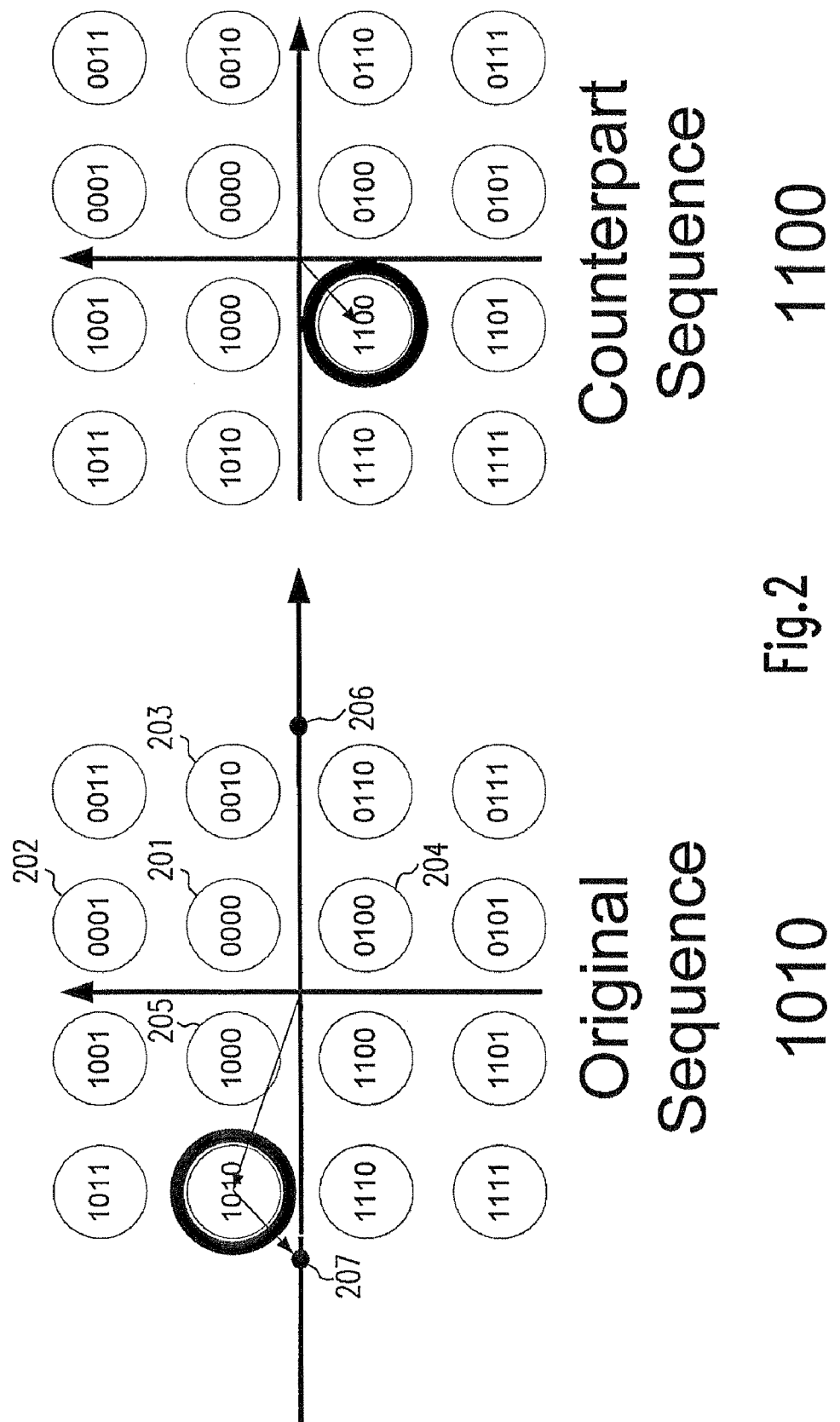
FIG. 2 gives an example of an original and a counterpart 4-bit sequence in 16-QAM.
Figure 13:
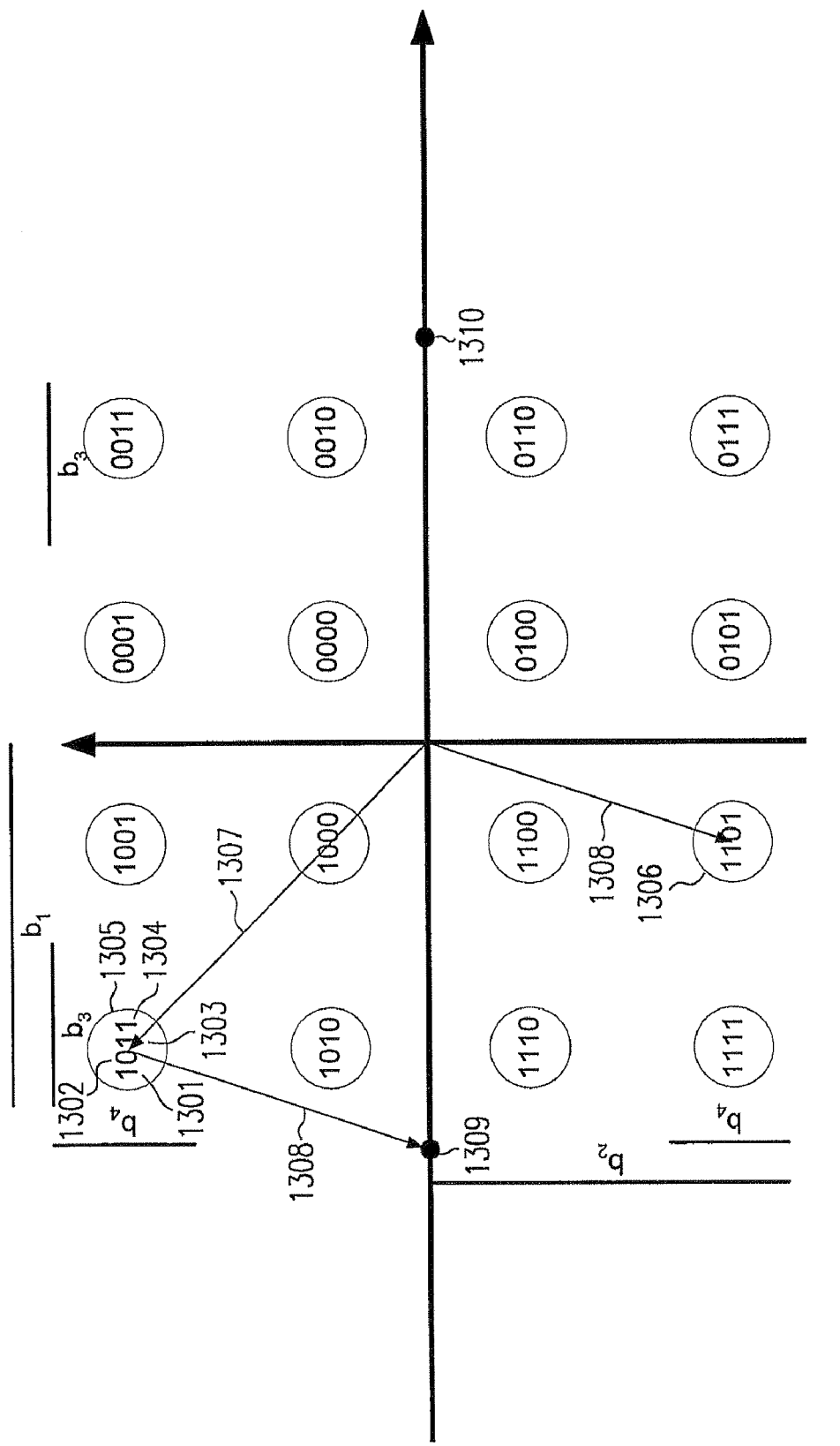
FIG. 13 illustrates an example for re-transmission with bit inversion with 16-QAM.

As an example, let us assume a transmission using the 16-QAM modulation scheme, as it can be seen in FIG. 2 and FIG. 13. According to Table 1, such a data symbol carries four bits. In the method described herein these four bits are transmitted twice:
1. Using the 16-QAM Gray mapping for the original sequence (four bits)
2. Using the same 16-QAM Gray mapping for the counterpart sequence (four bits)

This is also illustrated in FIG. 2 where as an example the original bit sequence 1010 and the counterpart sequence 1100 are highlighted. Each sequence of four bits is mapped to a modulation state of the 16-QAM. As the applied mapping is a Gray mapping, closest neighbours always differ in the value of only one bit. For example modulation state 201 is assigned to the bit sequence "0000". The four closest neighbours 202-205 are assigned to bit sequences "0001", "0010", "0100" and "1000".

Each sequence of four bits is associated with a further bit sequence which is obtained by bit inversion as explained below. As a result of combining the first symbol resulting from the first bit sequence with the further symbol resulting from the further bit sequence, the number of ambiguities is reduced to two vector sum results 206 and 207, having one amplitude level and two phase levels, similar to the constellation of a BPSK modulation.

Figure 3:
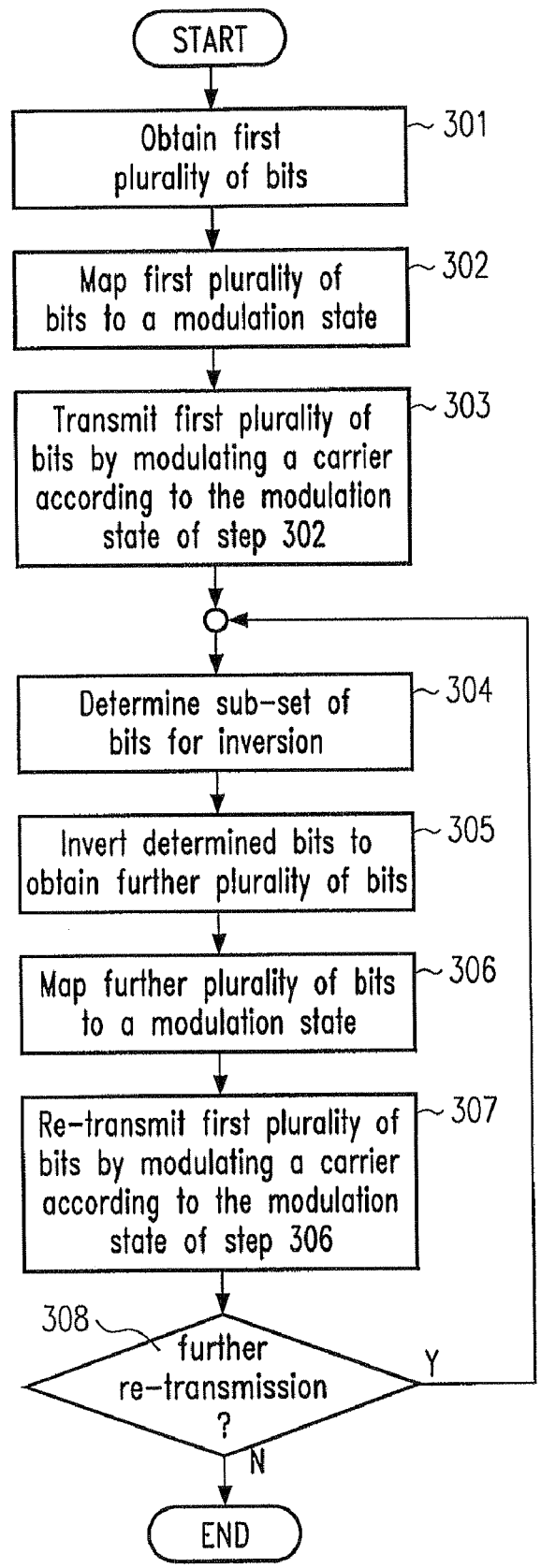
FIG. 3 illustrates steps of a method for improving the reliability in the estimation of digital transmission channel properties.

The flow chart of FIG. 3 illustrates the steps necessary for reducing ambiguity in transmission channel estimation.

In step 301 a first sequence or plurality of bits is received. The number of bits comprised within one sequence depends on the number of different modulation states in the applied modulation scheme. For example, for 64-QAM each sequence contains ld 64=6 bits. For 8-PSK each plurality of bits contains ld 8=3 bits.

In Step 302 the first plurality of bits is mapped to a modulation state according to a pre-defined Gray mapping of bit sequences to modulation states. In step 303 the first bit sequence is transmitted by modulating a carrier according to the modulation state assigned to the bit sequence in the Gray mapping.

For each re-transmission a sub-set of bits comprised in the bit sequence is determined for inversion in step 304. Determining step 304 may for example be carried out by executing a determining algorithm, by receiving data from a peer entity or by just reading data from a memory. In step 305 a further plurality of bits is obtained by taking the first plurality of bits from step 301 and inverting those bits according to one of the inversion rules determined in step 304. This further bit sequence is mapped onto a modulation state in step 306 according to the same Gray mapping used in step 302. In step 307 the first sequence is re-transmitted by transmitting the further sequence obtained in step 305, that is by modulating the carrier according to the modulation state obtained in step 306.

Step 308 queries whether there are further re-transmissions of the same first bit sequence to be done. If this is the case, the method returns to box 304. If not, the method ends and the transmission and re-transmissions of the first bit sequence are done.

As mentioned above, in determining step 304 one inversion rule is chosen to obtain a further bit sequence. This inversion rule can be expressed as a sub-set of bits which have to be inverted. Depending on the mapping method chosen, there can be one or several inversion rules required to reduce the ambiguities to the desired target levels. Determining step 304 should choose one of such rules for each re-transmission, preferably such that each inversion rule will have been determined once for a given first plurality of bits. In the following, the determination of inversion rules which should be chosen from in step 304 will be explained in greater detail with reference to different modulation schemes.

Figure 4:
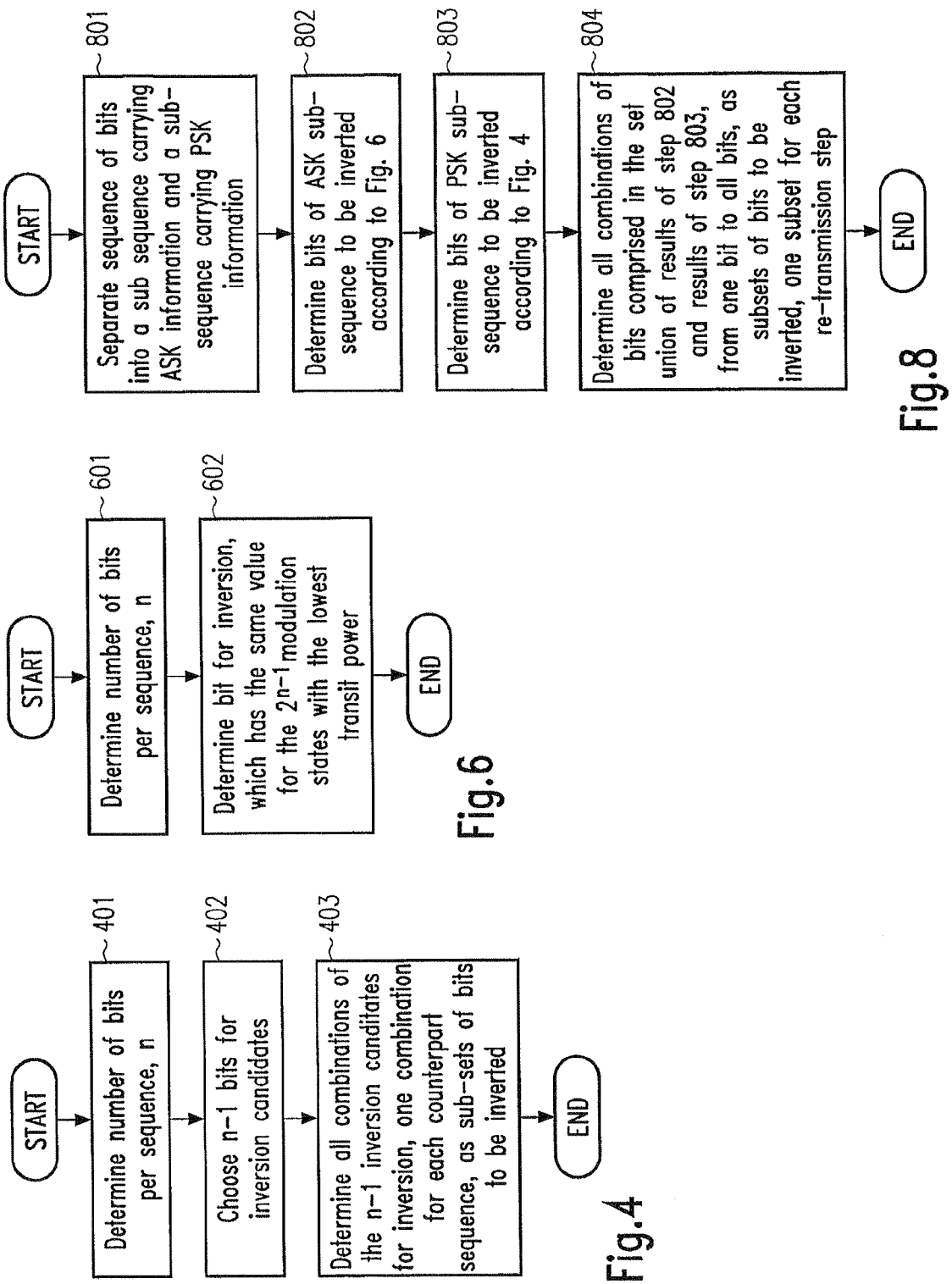
FIG. 4 shows steps for determining bits to be inverted for re-transmission with PSK.
Figure 5:
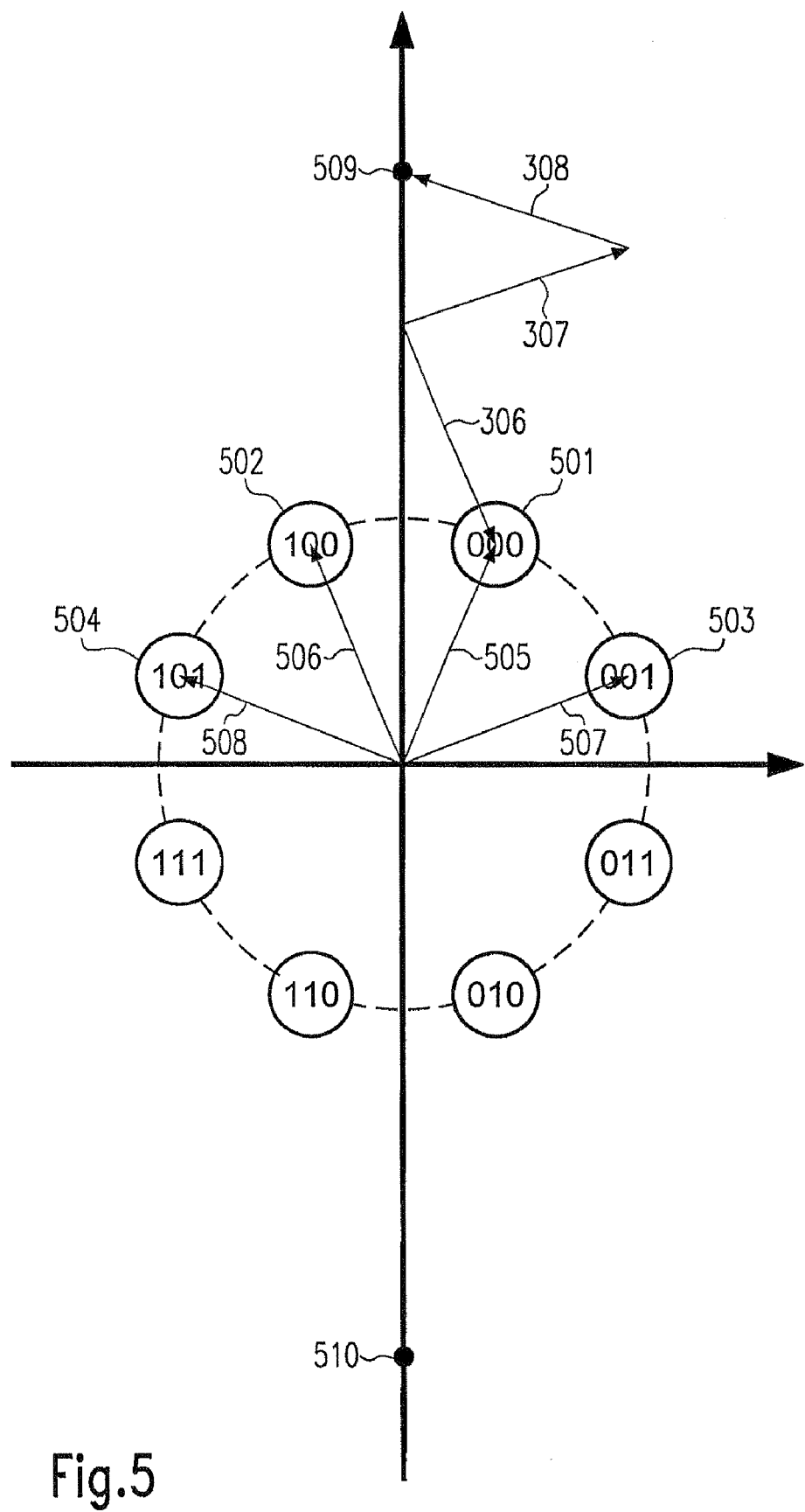
FIG. 5 illustrates an example for re-transmission with bit inversion with 8-PSK.

For PSK modulations using Gray Mapping the following algorithm shown in FIG. 4 may be applied:
Let n be the number of bits mapped onto one PSK symbol (step 401).
From the n bits, choose n−1 bits for inversion candidates (step 402).
Inversion Rule(s): Determine the bits to be inverted by obtaining all possible combinations using 1 to all n−1 bits of the chosen n−1 bits (step 403).
Obtain the n−1 counterpart bit sequences from the original bit sequences by inverting the bit(s) from the above found combinations.
An example is explained for the constellation shown in FIG. 5.
Using 8-PSK, 3 bits are mapped onto one symbol→n=3.
The first and third bit are chosen for inversion candidates.
Inversion rules: Invert only the 1st, only the 3rd, or both the 1st+3rd bit.
Original bit sequences in Gray Coding:
 000, 001, 011, 010, 110, 111, 101, 100.
Counterpart sequences inverting 1st bit:
 100, 101, 111, 110, 010, 011, 001, 000.
Counterpart sequences inverting 3rd bit:
 001, 000, 010, 011, 111, 110, 100, 101.
Counterpart sequences inverting 1st and 3rd bit:
 101, 100, 110, 111, 011, 010, 000, 001.
Modulation state 501 is assigned to bit sequence "000". By applying the inversion rules, bit sequences "100", "001" and "101" are obtained, to which modulation states 502-504 are assigned. The symbols are combined by adding the vectors

505-508 representing the complex values of the carrier for these modulation states. The result is point 509 for all bit sequences mapped to the upper half plane, and point 510 for all bit sequences mapped to the lower half plane. Therefore the result can only have one amplitude value and two different phase values.

For all schemes that involve PSK at least partly (for example n-PSK, n-ASK/m-PSK, n-QAM, as outlined above), that is at least part of the information is contained in the phase of an information symbol, the number of ambiguities can be reduced to one amplitude level and two phase levels. A reduction to one phase level is not possible by the proposed method, and indeed could only be achieved if the coherent combination of symbols results in the origin of the complex plane, which will not allow an estimation of the amplitude or phase change in the channel. Whether this denotes one level of ambiguity or infinite levels of ambiguity is an academic discussion, as those skilled in the art will realise that such a result is of no use for channel estimation.

Figure 7:
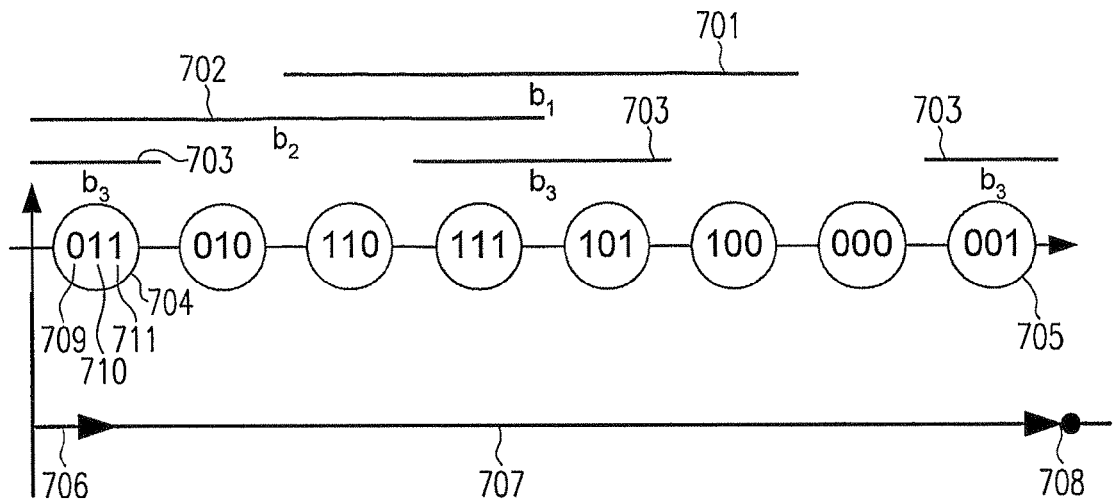
FIG. 7 illustrates an example for re-transmission with bit inversion with 8-ASK.

For ASK modulations where the transmit power of the symbols is sorted either in ascending or descending order according to Gray Coding as shown in FIG. 7, the following algorithm shown in FIG. 6 may be applied:
  Let n be the number of bits mapped onto one ASK symbol (step 601).
  Inversion rule: Invert exactly the one bit that carries the same bit value for the exactly $0.5*2^n=2^{n-1}$ symbols with the lowest transmit powers (step 602).
  Obtain the counterpart sequence by applying the inversion rule to the original bit sequences.

It may be noted by those skilled in the art that the same inversion bit may be alternatively identified as the bit that carries the same bit value for the exactly $0.5*2^n=2^{n-1}$ symbols with the highest transmit powers.

As an example, the 8-ASK-modulation with the mapping of FIG. 7 is regarded. In FIG. 7, bars 701, 702 and 703 indicate where bit 1, 2 and 3, respectively, has a value of "1". The bit order assumed is $b_1 b_2 b_3$.
  Using 8-ASK, 3 bits are mapped onto one symbol→n=3
  The bit that carries the same value for the exactly $0.5*2^3=4$ smallest transmit power symbols is the 2nd bit $b_2$, which is equal to one for those symbols.
  Inversion rule: Invert the 2nd bit $b_2$.
  Original bit sequences in Gray Coding:
    011, 010, 110, 111, 101, 100, 000, 001
  Counterpart sequences inverting 2nd bit:
    001, 000, 100, 101, 111, 110, 010, 011.

Modulation state 704 is assigned to bit sequence "011". according to the inversion rule above, the counterpart sequence, "001", is obtained by inverting the second bit. To the counterpart sequence "001", modulation state 705 is assigned. The symbols are combined by adding vectors 706 and 707 representing the complex values of modulation states 704 and 705. By calculating the combination result of all first bit sequences with their counterpart sequence, it becomes apparent that the result is always point 708. Therefore in this case there is no ambiguity left in the determination of the transmission channel properties.

If only ASK is used, the number of ambiguities can be reduced to one amplitude and one phase level.

Figure 9:
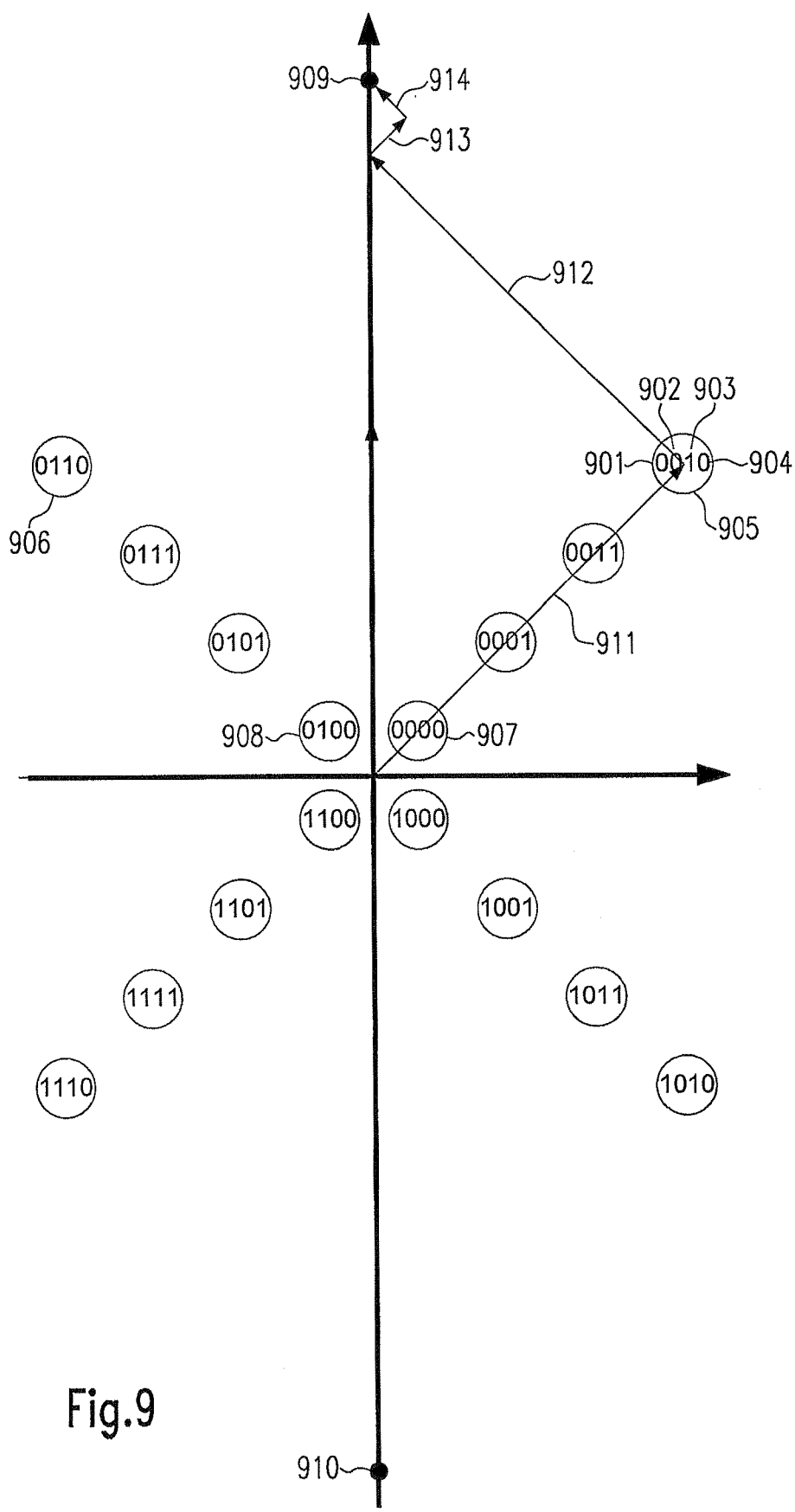
FIG. 9 illustrates an example for re-transmission with bit inversion with 4-ASK/4-PSK.

For mixed ASK/PSK modulations as shown in FIG. 9, where the bits are separable into bits that carry Gray Coded ASK information and bits that carry Gray Coded PSK information ("star QAM"), these bits should be treated individually according to the PSK or ASK rules described above. The resulting algorithm is shown in the flow chart of FIG. 8:

Separate the ASK/PSK modulation into independent ASK and PSK parts (step 801).
Determine inversion rules separately for the ASK and PSK part according to the algorithms described above.
Determine which ASK/PSK bits correspond to the inversion rule bits from the ASK part (step 802) and the PSK part (step 803).
Determine ASK/PSK inversion rules by combining from 1 to all ASK/PSK inversion rule bits (step 804).
Obtain all counterpart sequences by inverting bits according to the determined ASK/PSK inversion rules (step 804).

Figure 10:
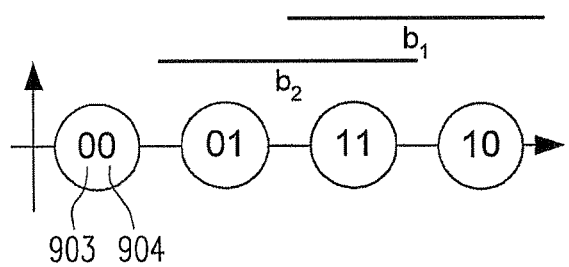
FIG. 10 depicts the 4-ASK part of the modulation scheme of FIG. 9.
Figure 11:
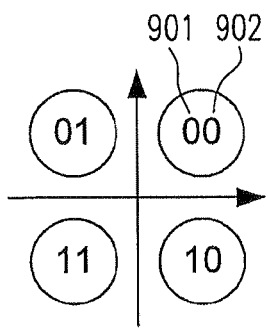
FIG. 11 depicts the 4-PSK part of the modulation scheme of FIG. 9.

As an example, the star-QAM of FIG. 9 is regarded.
Using 4-ASK/4-PSK as seen in FIG. 9, the first 2 bits 901, 902 are mapped as PSK, and last 2 bits 903, 904 are mapped as ASK->nASK=2, nPSK=2.
ASK part (see FIG. 10):
  The bit that carries the same value for the $0.5*2^{2=2}$ smallest transmit power symbols is the 1st bit 903, which is equal to zero for those bits
  Inversion rule: Invert the 1st ASK bit 903.
  Original ASK bit sequences in Gray Coding: 00, 01, 11, 10
  Counterpart sequences inverting 1st bit 903: 10, 11, 01, 00
PSK part (see FIG. 11)
  The second bit 902 is chosen.
  Inversion rule: Invert the 2nd PSK bit 902.
  Original bit sequences in Gray Coding: 00, 01, 11, 10
  Counterpart sequences inverting 2nd bit 902: 01, 00, 10, 11
Determining ASK/PSK inversion rule bits:
  1st bit of ASK part 903 is 3rd bit of ASK/PSK part
  2nd bit of PSK 902 part is 2nd bit of ASK/PSK part
Determine ASK/PSK inversion rules
  Inversion rules: Invert only the $2^{nd}$ 902, only the $3^{rd}$ 903, or both the $2^{nd}$ and $3^{rd}$ 902, 903 ASK/PSK bit
  Original ASK/PSK bit sequences:
    0000, 0001, 0011, 0010, 0100, 0101, 0111, 0110, 1100, 1101, 1111, 1110, 1000, 1001, 1011, 1010
  Counterpart ASK/PSK sequences inverting 2nd bit:
    0100, 0101, 0111, 0110, 0000, 0001, 0011, 0010, 1000, 1001, 1011, 1010, 1100, 1101, 1111, 1110
  Counterpart ASK/PSK sequences inverting 3rd bit:
    0010, 0011, 0001, 0000, 0110, 0111, 0101, 0100, 1 110, 1111, 1101, 1100, 1010, 1011, 1001, 1000
  Counterpart ASK/PSK sequences inverting 2nd and 3rd bit:
    0110, 0111, 0101, 0100, 0010, 0011, 0001, 0000, 1010, 1011, 1001, 1000, 1110, 1111, 1101, 1100.

Modulation state 905 is assigned to bit sequence "0010". The PSK sub-sequence is "00" and the ASK sub-sequence is "10". According to the rules above, there is one bit, 902 determined to be inverted from the PSK sub-sequence and one bit, 903 determined for inversion from the ASK sequence. Consequently there are three counterpart bit sequences. Only bit 902 inverted yields "0110", to which modulation state 906 is assigned. Only bit 903 inverted yields "0000", to which modulation state 907 is assigned. Both bits 902 and 903 inverted yields "0100", corresponding to modulation state 908. If all symbols are combined by adding up the vectors 911-914 representing the respective complex values, the result is point 909. If this calculation is done for all possible value combinations of the bit sequence, it appears that the combined result is in point 909 for all bit sequences assigned to modulation states in the upper half plane and point 910 for all bit sequences assigned to modulation states located in the lower half plane. Thus ambiguity is reduced to one amplitude value and two phase values.

For this kind of mixed ASK and PSK, ambiguity can also be reduced if the inversion rules from one of the two parts is applied alone. For the example of FIG. 9, if only one counterpart sequence is obtained by inverting the second bit 902, there are eight possible combination results which are all located on the imaginary axis. Therefore ambiguity is reduced to two phase values and four amplitude values, equivalent to a 4-ASK/2-PSK.

Figure 12:
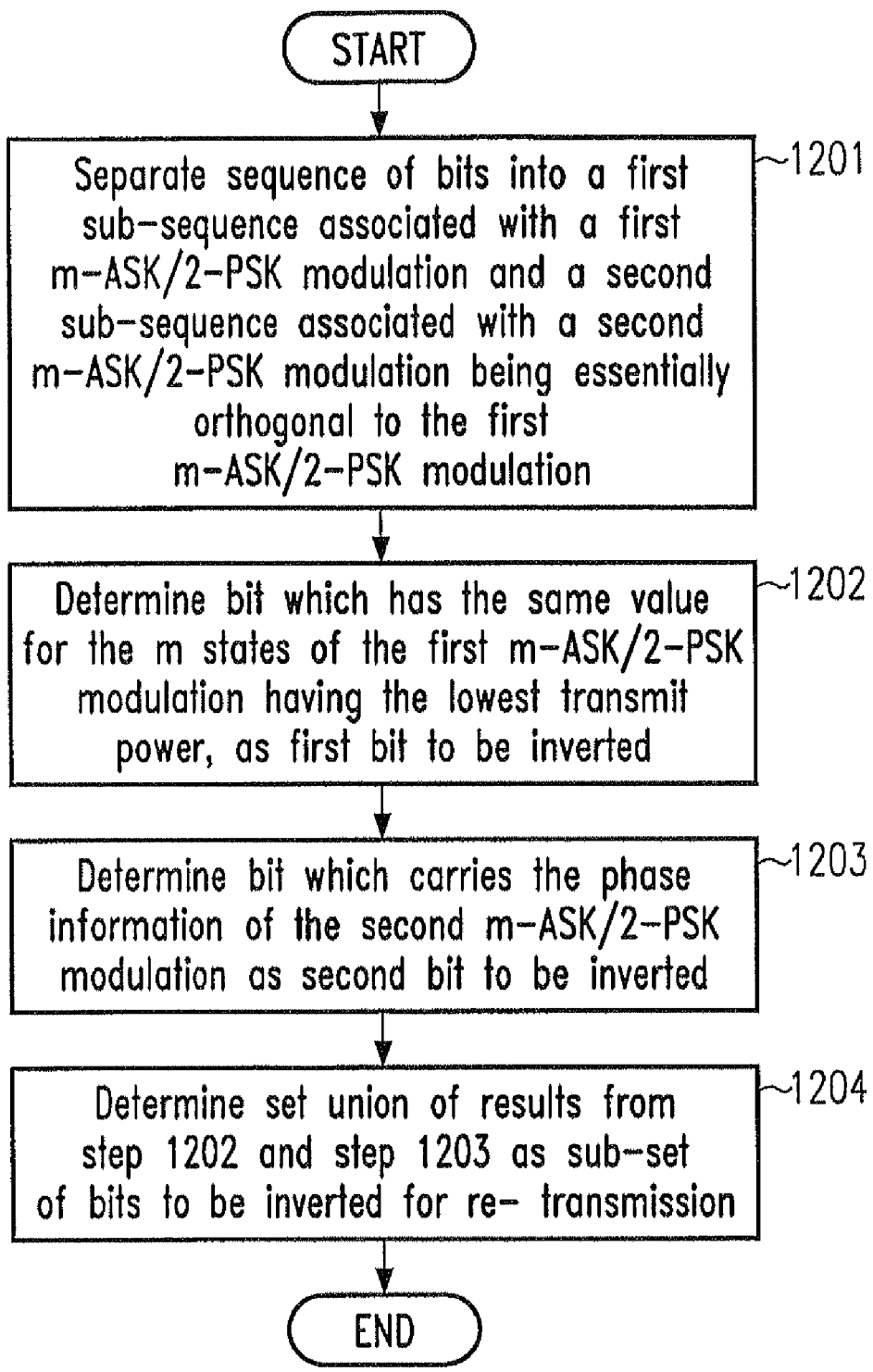
FIG. 12 shows steps for determining bits to be inverted for re-transmission with square QAM.

A special way of mixed ASK/PSK modulation is the combination of two orthogonal Gray Coded m-ASK/2-PSK modulations. This mixed constellation is sometimes also called "square QAM", in the following simply sq-QAM. Instead of treating the two ASK/PSK modulations individually, a more efficient way is introduced here with reference to FIGS. 12 and 13.

Separate the sq-QAM into two orthogonal m-ASK/2-PSK modulations, afterwards called AP1 and AP2 (step 1201).

AP1 Inversion rule: The bit to be inverted is the bit that has the same bit value for the exactly m/2 symbols with the smallest transmit power of the m-ASK part (step 1202). This is technically equivalent to the m symbols of the m-ASK/2-PSK with the smallest transmit power.

AP2 Inversion rule: The bit to be inverted is the bit that carries the 2-PSK part information (step 1203).

Determine which bits of the sq-QAM correspond to the separate AP1 and AP2 inverted bits.

Obtain sq-QAM inversion rule by combining both AP1 and AP2 inversion rules for the corresponding QAM bits.

Obtain the sq-QAM counterpart sequence by applying the sq-QAM inversion rule.

It may be noted by those skilled in the art that for AP1 the same inversion bit may be alternatively identified as the bit that carries the same bit value for the exactly m/2 symbols with the highest transmit powers of the m-ASK part.

It should be noted that for a constellation layout as in the examples of FIGS. 13 and 16-19, the in-phase component could be chosen to be either AP1 or AP2 with the quadrature component being the respective other one. This does not make a difference to the effect of ambiguity reduction. In one case the combination results have real values, in the other case they have imaginary values.

Furthermore, two components orthogonal to each other but not parallel to any of the real and imaginary axes could be chosen to be AP1 and AP2, respectively.

EXAMPLE

Figure 14:
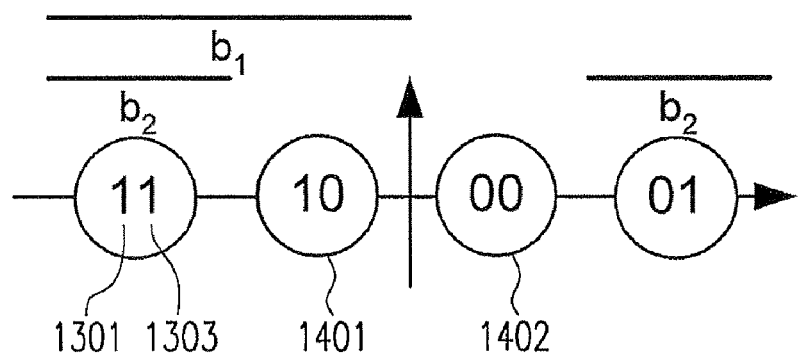
FIG. 14 depicts the in-phase part of the modulation scheme of FIG. 13.
Figure 15:
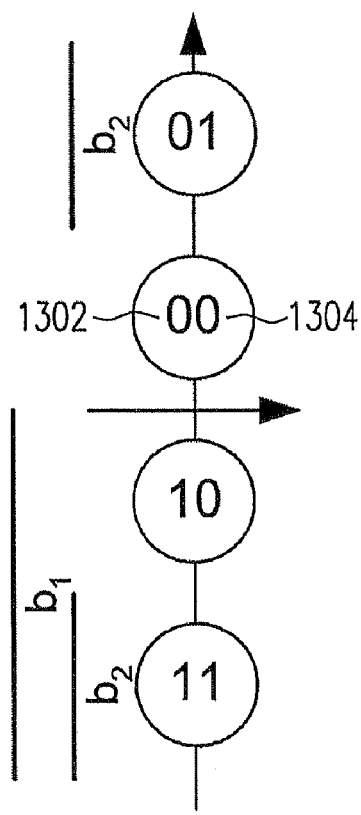
FIG. 15 depicts the quadrature part of the modulation scheme of FIG. 13.
Figure 16:
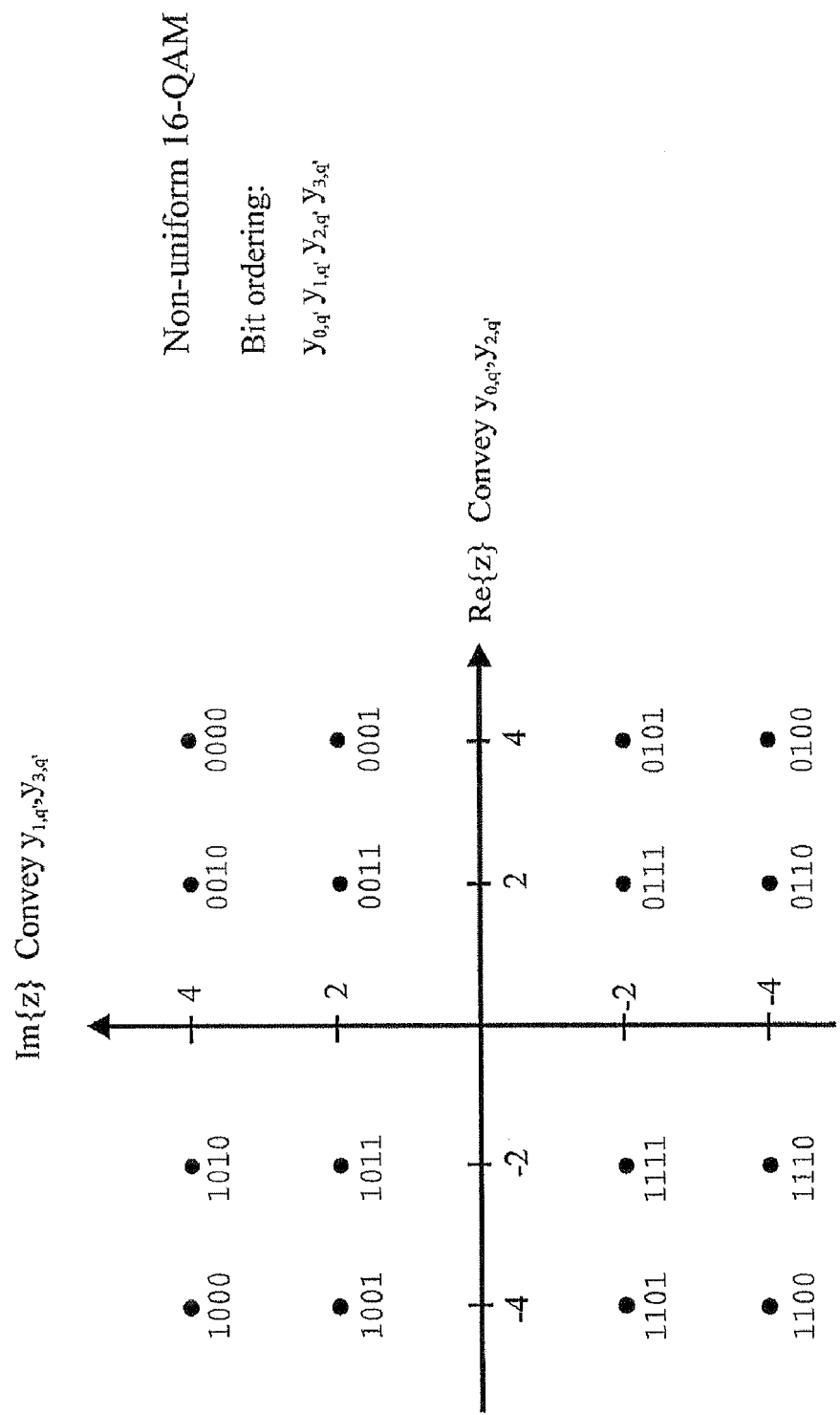
FIGS. 16 to 19 show examples of non-uniform square QAM.
Figure 17:
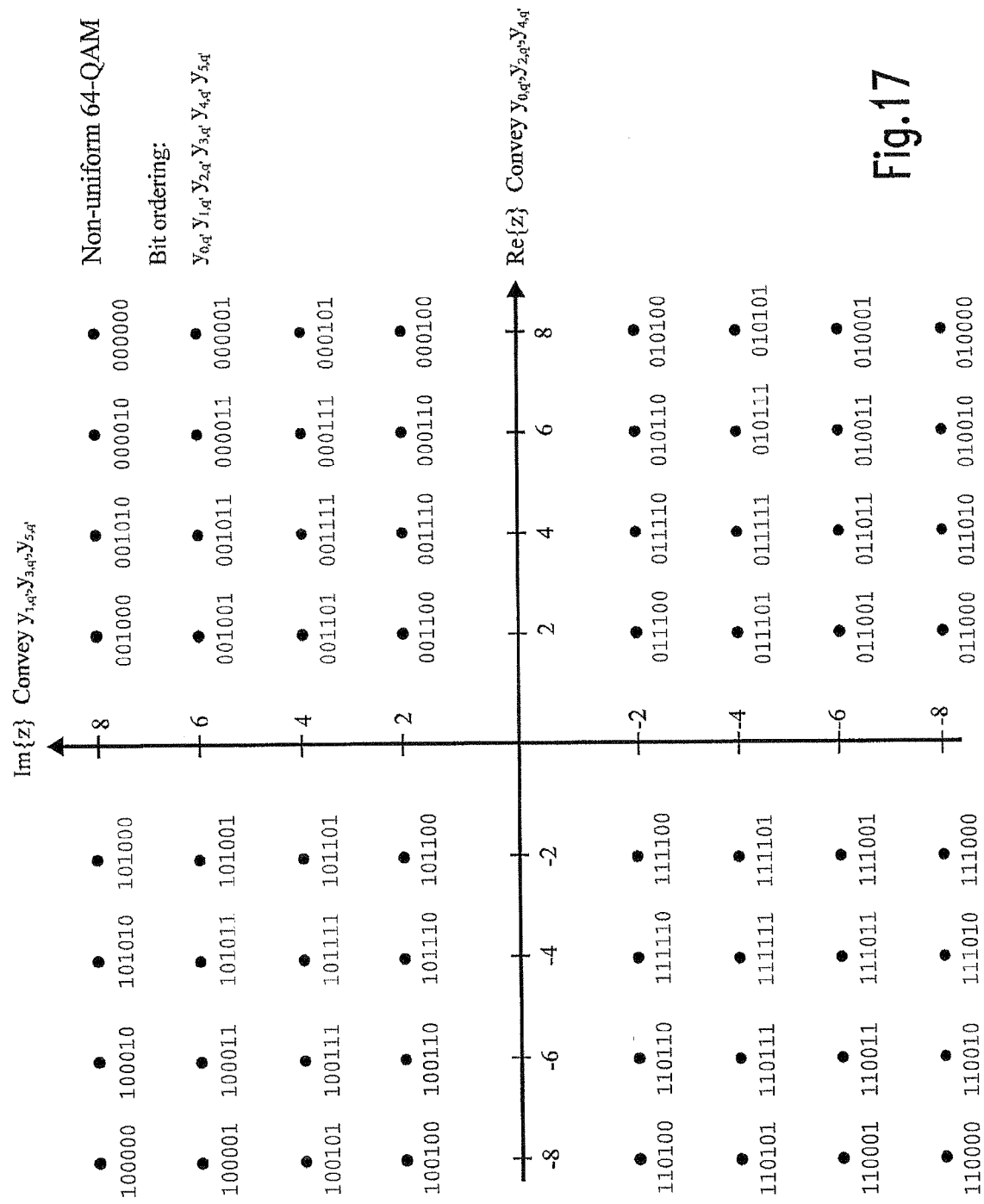
Figure 18:
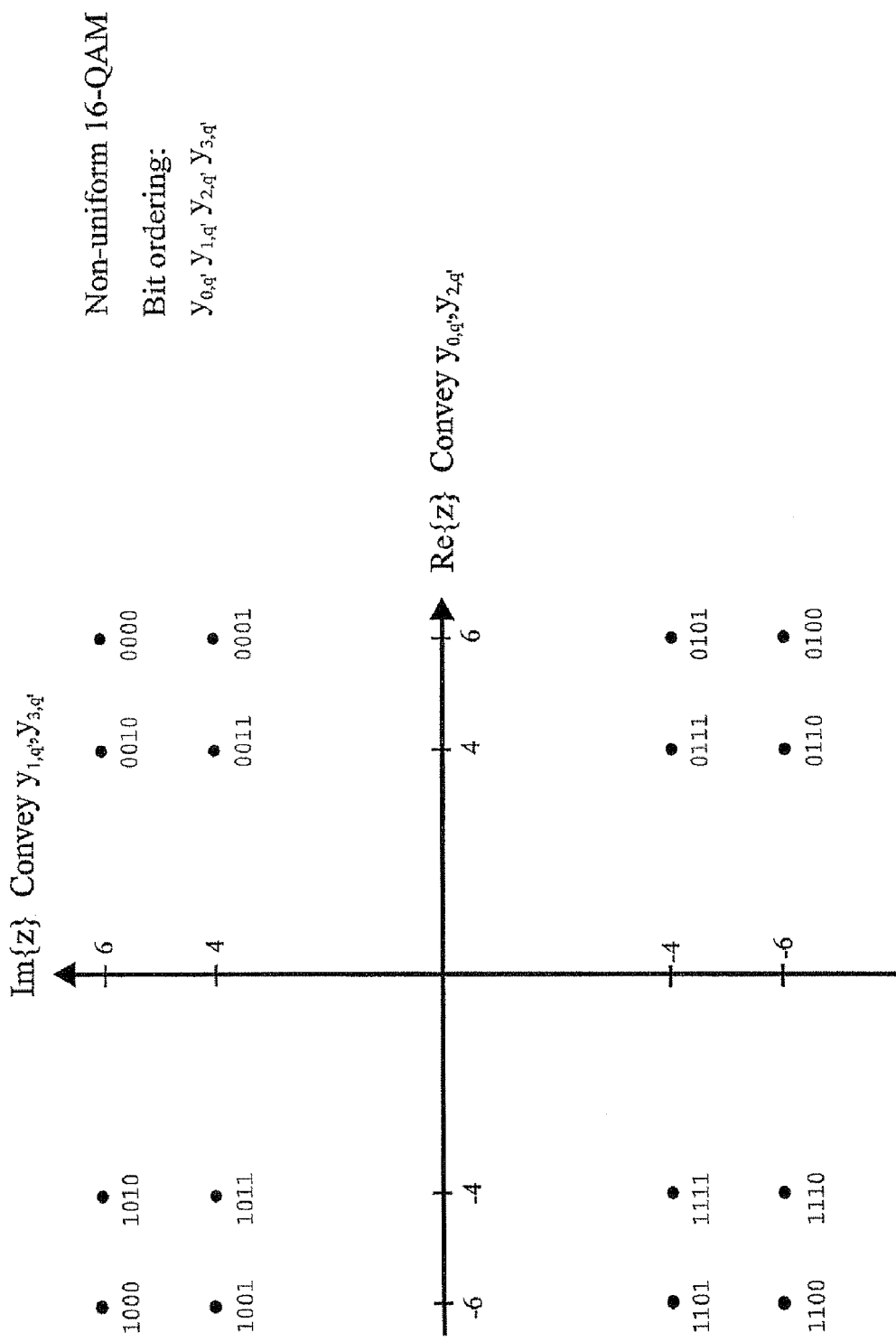
Figure 19:
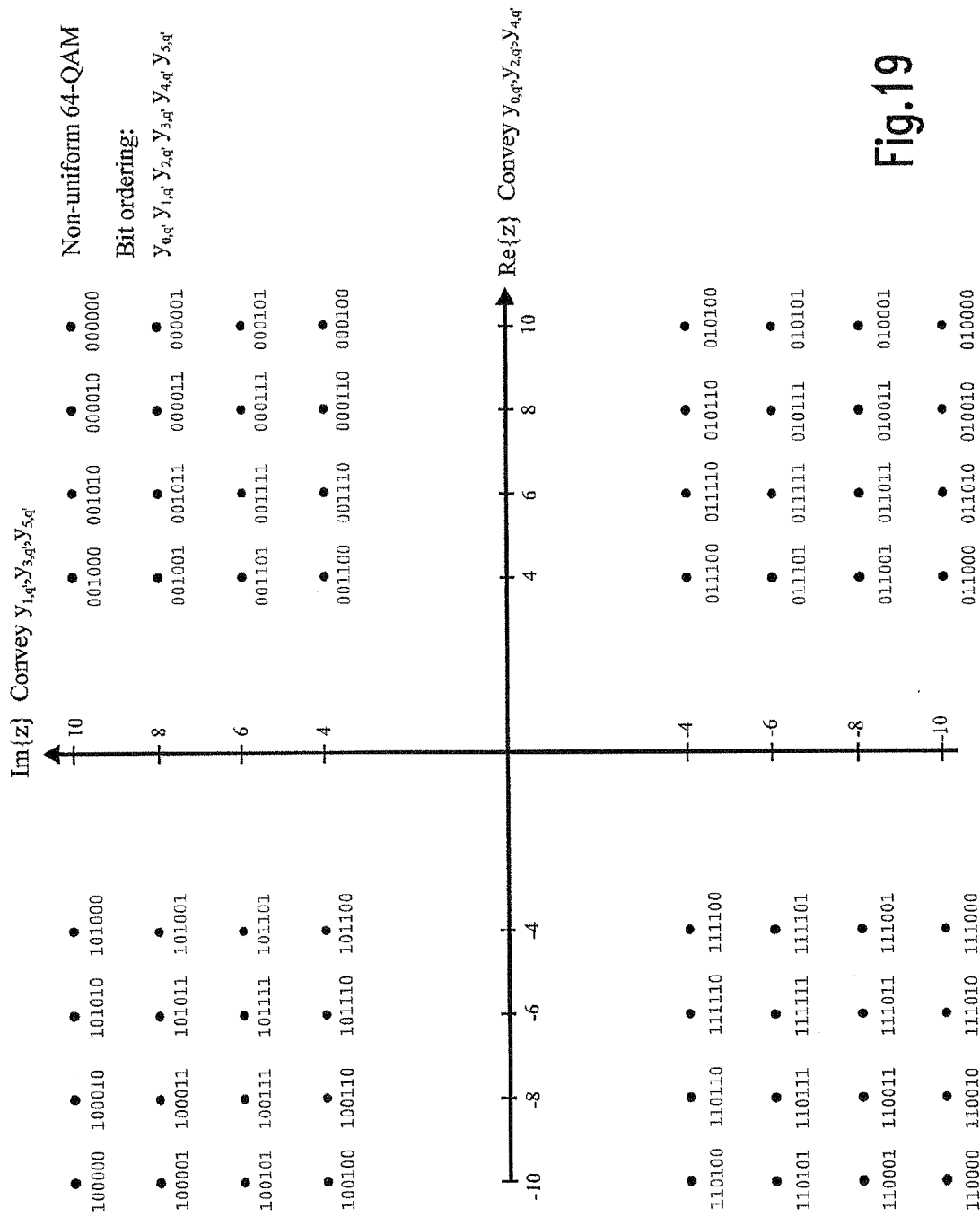

Using 16-sq-QAM as in FIG. 13, AP1 is defined as the 2-ASK/2-PSK in FIG. 14, AP2 as the 2-ASK/2-PSK in FIG. 15.

AP1:
The bit that carries the same value for the exactly m/2=1 smallest transmit power symbol of the ASK part (1401 or 1402) is the 2nd ASK/PSK bit 1303, which is equal to zero for those symbols (see FIG. 14)
Inversion rule AP1: Invert the 2nd ASK/PSK bit 1303.

AP2:
The bit that carries the PSK information is the 1st ASK/PSK bit 1302, which is equal to zero for a phase of 90 degrees against the real axis and equal to 1 for a phase of 270 degrees against the real axis (see FIG. 15).
Inversion rule AP2: Invert the 1st ASK/PSK bit 1302.

Correspondence of AP1 and AP2 inversion rule bits to original QAM bits (see FIG. 13):
The 2nd ASK/PSK bit 1303 from AP1 corresponds to the 3rd QAM bit
The 1st ASK/PSK bit 1302 from AP2 corresponds to the 2nd QAM bit
Obtain 16-sq-QAM Inversion rule: Invert both the $2^{nd}$ and the $3^{rd}$ sq-QAM bits.
Original sq-QAM bit sequences:
0000, 0001, 0011, 0010, 0100, 0101, 0111, 0110, 1100, 1101, 1111, 1110, 1000, 1001, 1011, 1010
Counterpart sq-QAM sequence inverting 2nd and 3rd bit:
0110, 0111, 0101, 0100, 0010, 0011, 0001, 0000, 1010, 1011, 1001, 1000, 1110, 1111, 1101, 1100.

Modulation state 1305 is assigned to bit sequence "1011". The counterpart "1101" is obtained by inverting the second and third bit and is associated with modulation state 1306. Combination of both symbols is accomplished by adding the vectors 1307 and 1308 representing the respective complex values of the modulation states. The result is point 1309. By repeating this calculation for all possible value combinations of the bit sequence, it appears that all bit sequences mapped to modulation states located in the left half plane yield a combination result equal to point 1309 and all bit sequences mapped to modulation states located in the right half plane yield a combination result equal to point 1310. Thus ambiguity is reduced to one amplitude value and two phase values.

It should be noted that sometimes the term "square QAM" is strictly applied only to QAM mappings where the distance between nearest neighbouring points is equal for all points of the constellations. However those skilled in the art will appreciate that the algorithm presented here is also applicable for QAM mappings where this property is valid only for a subset of points. Examples are the non-uniform 16-QAM and 64-QAM constellations that are used in DVB, shown in FIGS. 16 to 19. In these constellations, the real axis and the imaginary axis are symmetry axes with respect to the constellation points representing complex values of the modulation states. Consequently we use the term "square QAM" here in a broad sense encompassing, but not restricted to, constellation layouts as in FIGS. 13 and 16-19.

Those skilled in the art will appreciate that a communication system or device may employ different methods to actually realise the determination of inversion rules. In one embodiment the inversion rules are obtained by executing the algorithms described in the present invention. In a preferred embodiment the inversion rules are determined for each modulation scheme used in the communication system or device and are stored in a memory or look-up table for quickly obtaining the inversion rules. In another preferred embodiment the inversion rules are coded into a hardware or software module, where step 304 is equivalent to controlling which of those hardware or software modules is chosen during transmission.

Some of the inversion rule algorithms will produce more than one counterpart sequence or inversion rule. This means that for optimum reduction of ambiguity levels more than one repetition of a bit sequence is necessary, i.e. a bit sequence has to be transmitted more than twice. If this is not desired from a system capacity point of view, then one of the counterpart sequences/inversion rule has to be chosen. The ambiguity reduction by using less than the optimum number of inversion rules will prefer either an increased reduction of amplitude ambiguities, or an increased reduction of phase ambiguities, as will be appreciated by those skilled in the art when inspecting the effects of combining original and counterpart symbols. It is therefore depending on the communication system and the prevalent channel conditions which ambiguity reduction is more important for reliable communication. If the demodulation depends highly on an accurate amplitude estimate at the receiver, then the amplitude ambiguity reduction is the preferred criterion for choosing the proper inversion rule; likewise if the demodulation depends highly on an accurate phase estimate at the receiver, then the phase ambiguity reduction is the preferred criterion for choosing the proper inversion rule.

The inversion rule algorithms described so far have assumed that the target is an optimum reduction of ambiguity levels by combining complex values of the first and further pluralities of bits mapped onto modulation states. However it may be desirable or sufficient to define the target as a suboptimum reduction of ambiguity levels. For example it might be desirable to reduce the ambiguity to a QPSK-equivalent level, which means one amplitude level and four phase levels. While a channel estimation for this is generally inferior compared to a BPSK-equivalent situation, it may be beneficial from a demodulated LLR value point of view for the data bits transmitted in the pluralities of bits.

Since the algorithm we have given for ASK results in only one amplitude level when considering the exactly $2^{n-1}$ modulation states with the lowest transmit power in step 602, this n bits per sequence (compare FIGS. 6 and 7), we can extend the algorithm to any number of target amplitude levels being a power of two. Let $2^k$ be the target number of amplitude levels. Then the procedure to find the inversion rule should be:

Determine bit for inversion, which has the same first value for the $2^{n-k-1}$ modulation states with the lowest transmit power and a value opposite to the first value for the next modulation state with the next higher transmit power value.

Or as mentioned earlier, alternatively:

Determine bit for inversion, which has the same first value for the $2^{n-k-1}$ modulation states with the highest transmit power and a value opposite to the first value for the next modulation state with the next lower transmit power value.

For k=0 we get the same strategy as mentioned earlier and as in block 602 of FIG. 6.

For k=n there is no reduction of amplitude levels possible. Consequently k can take preferably integer values ranging from 0 to n−1.

As an example applying k=1 to the constellation in FIG. 7 where n=3, the two constellation points "011" and "010" have equal bit values $b_1$=0 and $b_2$=1. However since $b_2$=1 not only for the two lowest transmit power points, but for the four lowest transmit power points, it does not fulfil the requirement of having "the same first value for the $2^{n-k-1}$ modulation states with the lowest transmit power and a value opposite to the first value for the next modulation states with the next higher transmit power value". Consequently bit $b_1$ is determined as the bit to be inverted in the inversion rule.

For PSK modulation schemes, a set of inversion rules is obtained. By choosing only a subset of these inversion rules, the ambiguity in phase can already be reduced. In the example for FIG. 5, an inversion of only the first bit results in just two phase levels after combination: Combination of symbol 501 with 502 and of symbols 503 with 504 results in two different points, however both of which are on the imaginary axis, sharing the same phase level. Overall this inversion rule alone results in combinations of two phase levels and two amplitude levels, equivalent to a 2-ASK/2-PSK. Likewise an inversion of only the third bit results in a QPSK-equivalent combination. Symbol 501 combined with 503 results in the same amplitude level as symbol 502 combined with symbol 504.

Altogether an inversion of the third bit only results in combinations of one amplitude level and four phase levels.

Figure 24:
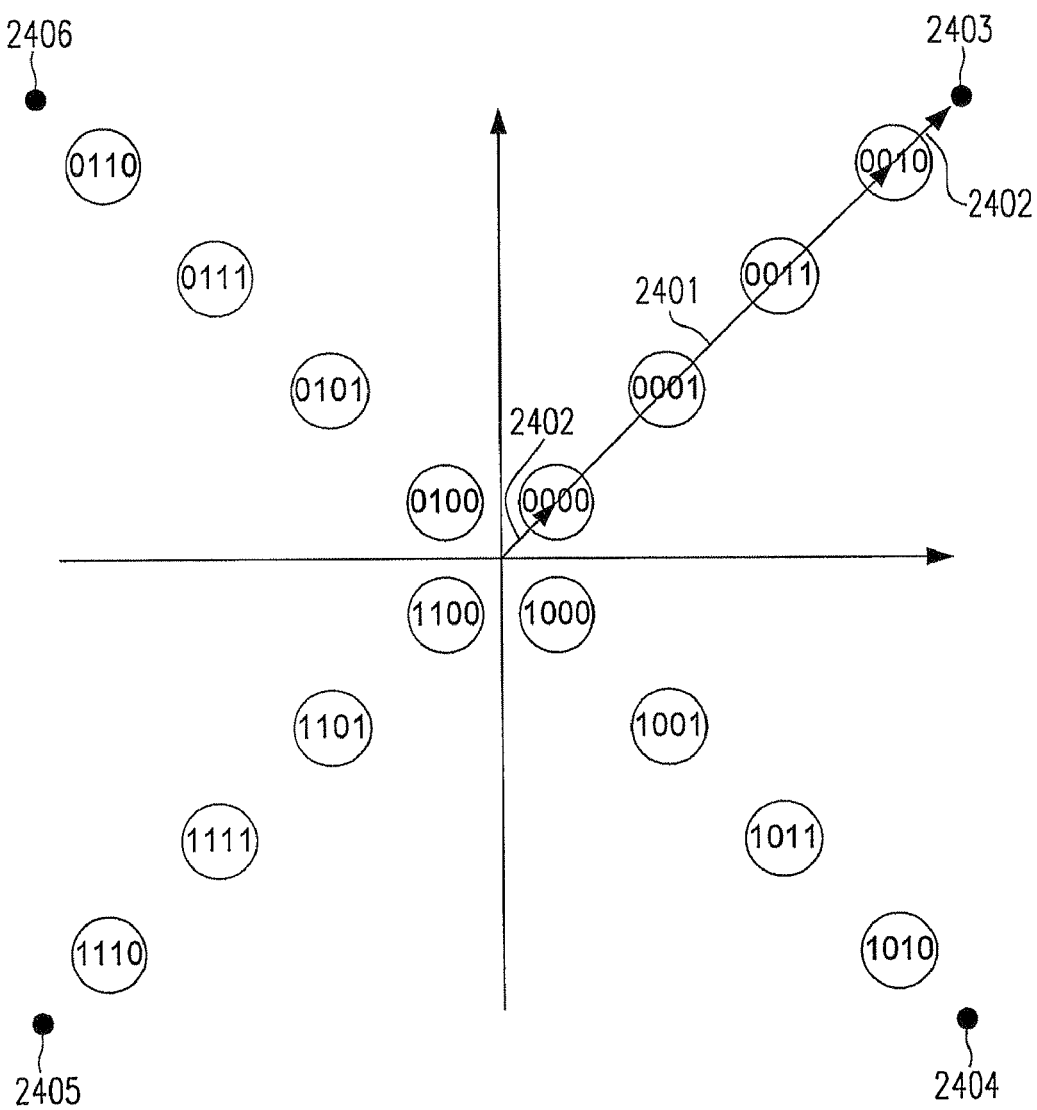
FIG. 24 depicts a suboptimum combination and inversion case resulting in a QPSK-equivalent ambiguity situation for an original 4-ASK/4-PSK.

Obviously the above strategies for reducing the amplitude or phase levels for ASK and PSK are also applicable to a mixed ASK/PSK. In the example of FIG. 24 the 4-ASK part is modified to reduce the number of amplitude levels from four to one by inverting the first ASK bit. The 4-PSK part is not modified, such that altogether the only inversion rule is the inversion of 4-ASK/4-PSK bit number three, being equivalent to 4-ASK bit number one. The combination results in one amplitude and four phase levels, equivalent to a QPSK.

As an example, vector 2401 represents the constellation point for the bit sequence "0010". The first ASK bit is the third bit in the sequence. Therefore the inversion rule determines to invert the third bit, which yields bit sequence "0000" represented by vector 2402. The combination of both transmissions yields value 2403. Other possible combination results for different values of the bit sequence are 2404, 2405 and 2406.

For the square-QAM or sq-QAM, a suboptimum reduction of ambiguity levels can be achieved if either of the AP1 or AP2 inversion rules are modified. As outlined above, for a combination of one amplitude and two phase levels, the AP1 inversion rule is equivalent to reducing ambiguities for an m-ASK part, and the AP2 inversion rule is equivalent to reducing ambiguities for a 2-PSK part. For a suboptimum combination with more amplitude levels than one, the reduction for the m-ASK part of AP1 should follow the extended algorithm as outlined above for reducing n amplitude levels of ASK to $2^k$ amplitude levels. For a suboptimum combination with more phase levels than two, the AP2 inversion rule for reducing the 2-PSK part should be replaced by the inversion rule for reducing the m-ASK part of AP2 to $2^k$ as outlined in the extended algorithm above. It should be mentioned that of course the value of k for AP1 can be different from the value of k for AP2.

Figure 25:
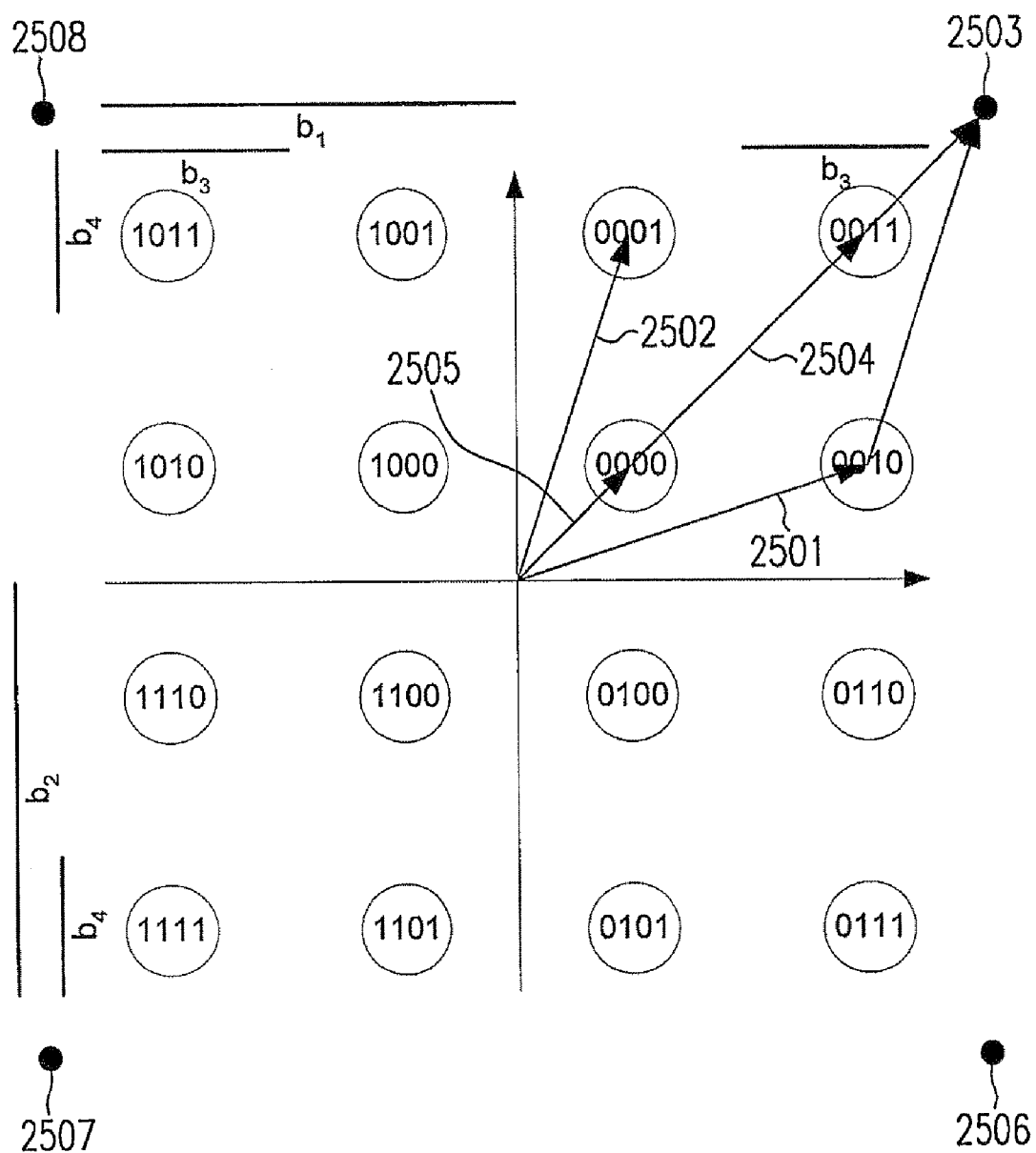
FIG. 25 depicts a suboptimum combination and inversion case resulting in a QPSK-equivalent ambiguity situation for an original 16-square-QAM.
Figure 26:
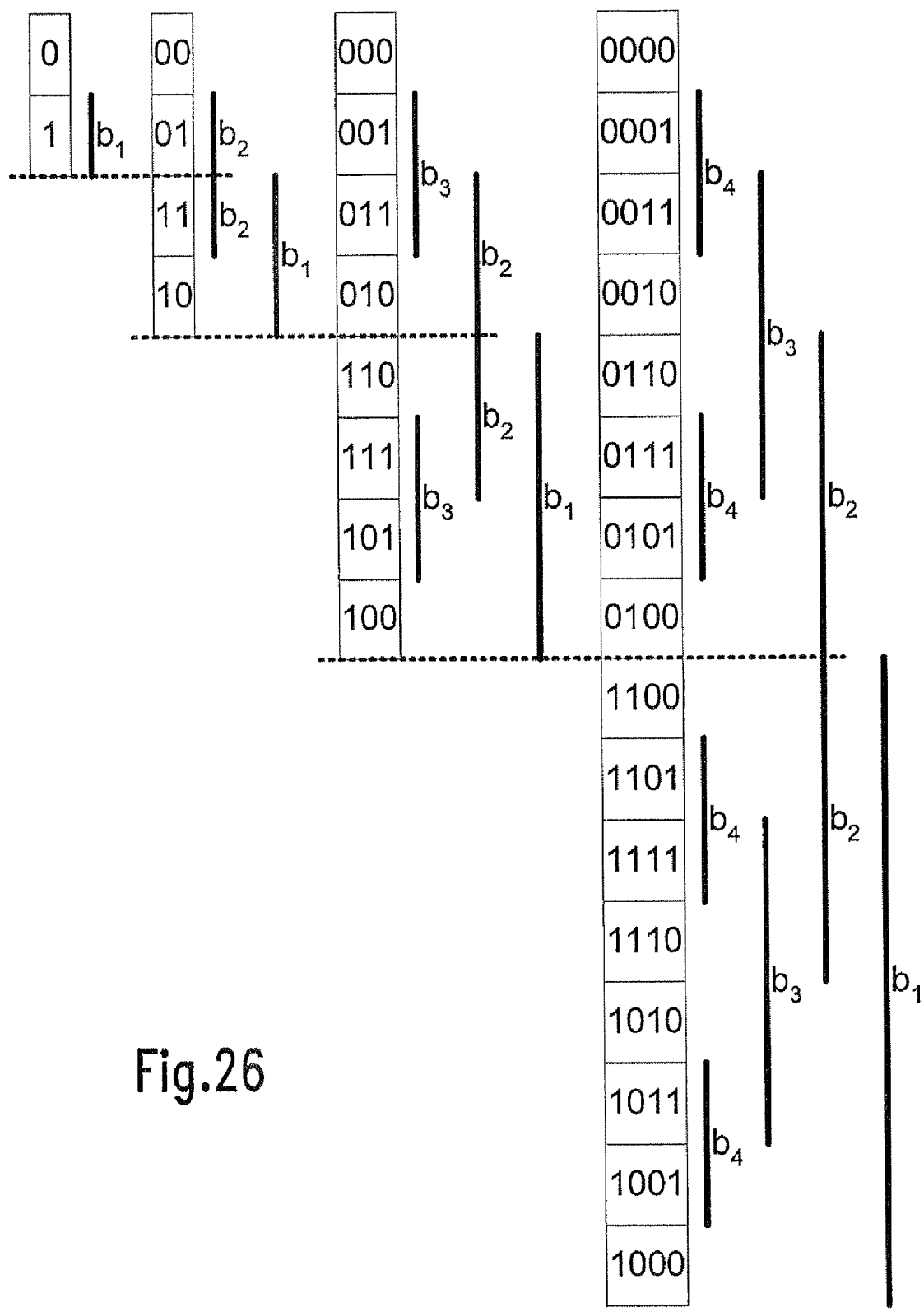
FIG. 26 shows an example of generating Gray coded bits sequences from 1 to 4 bits using a prior art algorithm.

In the example of FIG. 25 it is shown that a combination of one amplitude level and four phase levels is achieved by Applying the AP1 inversion rule for the 2-ASK part, inverting the second bit 1303 of the two AP1 ASK/PSK modulation bits (compare FIG. 14)

Applying the modified AP2 inversion rule for the 2-ASK part, inverting the second bit 1304 of the two AP2 ASK/PSK modulation bits (compare FIG. 15)

Resultant inversion rule: Invert the third and fourth 16-sq-QAM bits $b_3$ and $b_4$, corresponding to the second bits of AP1 and AP2 respectively.

As an example, bit sequence "0010" is represented by vector 2501. AP1 inversion rule determines the third bit $b_3$ of the bit sequence as bit to be inverted (being the second bit of $b_1$ and $b_3$). AP2 inversion rule determines the fourth bit $b_4$ to be inverted (being the second bit of $b_2$ and $b_4$). The resulting bit sequence for the second transmission (or re-transmission) is "0001", represented in the complex plane of modulation states by vector 2502. The combination of both modulation states, achieved by addition of vectors 2501 and 2502, yields complex point 2503. Similarly, for bit sequence "0011" represented by vector 2504, the bit sequence for the second transmission is "0000" represented by vector 2505. The combination of both values again yields complex value 2503. Other possible combination results for other bit sequences are points 2506, 2507 and 2508.

The original constellation may be different from what is shown in the examples. However the procedure as outlined above can still be used as long as the mapping of bit sequences is compliant to the Gray coding/mapping strategy.

Figure 20:
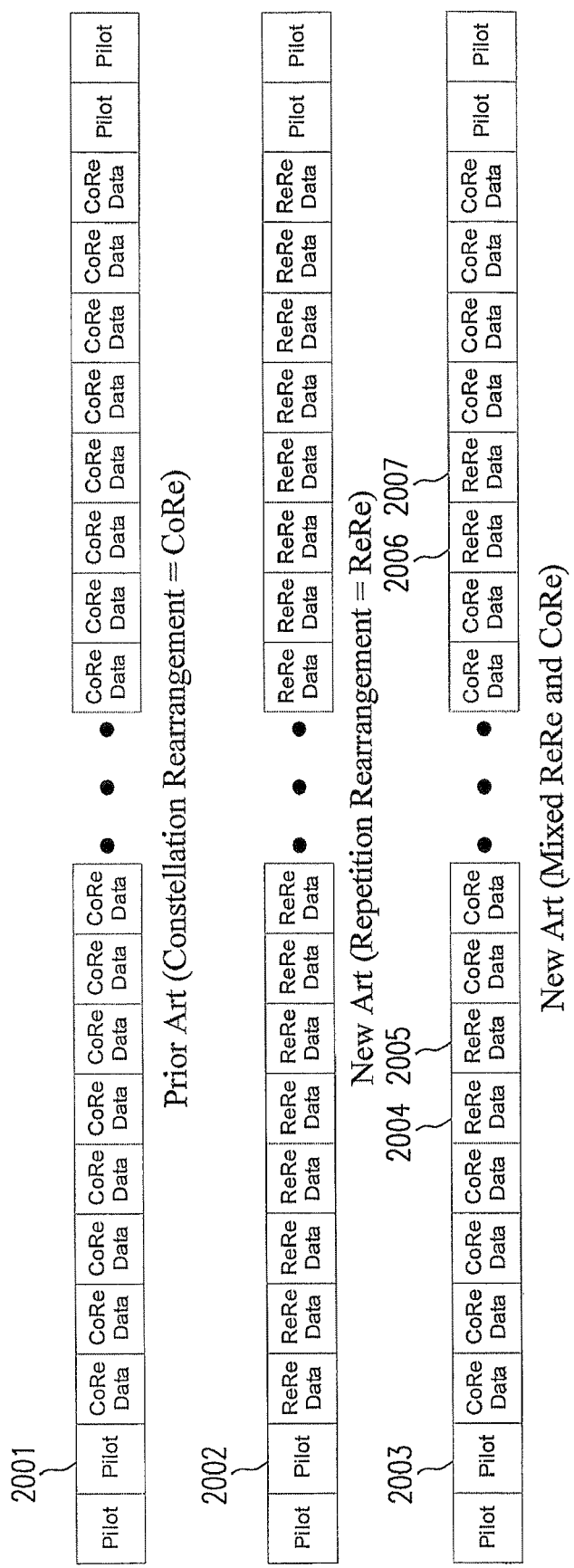
FIG. 20 depicts examples of a one-dimensional frame structure for Pilot and Data symbols.

Not all bit sequences in a frame have to use the approach as disclosed in the present invention. If the channel is only slowly varying, a small number of modified bit sequences can be sufficient to facilitate good channel estimation conditions for a receiver. Consequently other bit sequences can use other methods known from prior art, such as Simple repetition or Constellation Rearrangement repetition. The latter is the preferred solution as it usually provides smaller bit error rates at a receiver. Such alternatives are depicted in FIG. 20. Data frame 2001 contains data transmitted according to prior art, in this case with constellation rearrangement. In contrary, data frame 2002 contains only data transmitted according to the method presented herein. Data frame 2003 contains data transmitted according to both methods. Symbol 2004 is repeated as symbol 2005 with a subset of the bits of the corresponding sequence of bits inverted as described in detail above. The same applies to symbol 2006, which is re-transmitted as symbol 2007.

The amount and position of modified bit sequences may be additionally signalled in a Control Channel explicitly or by means of a predefined parameter from the transmitter to the receiver, to provide the receiver with knowledge which part of the data frame follows which repetition strategy.

Figure 21:
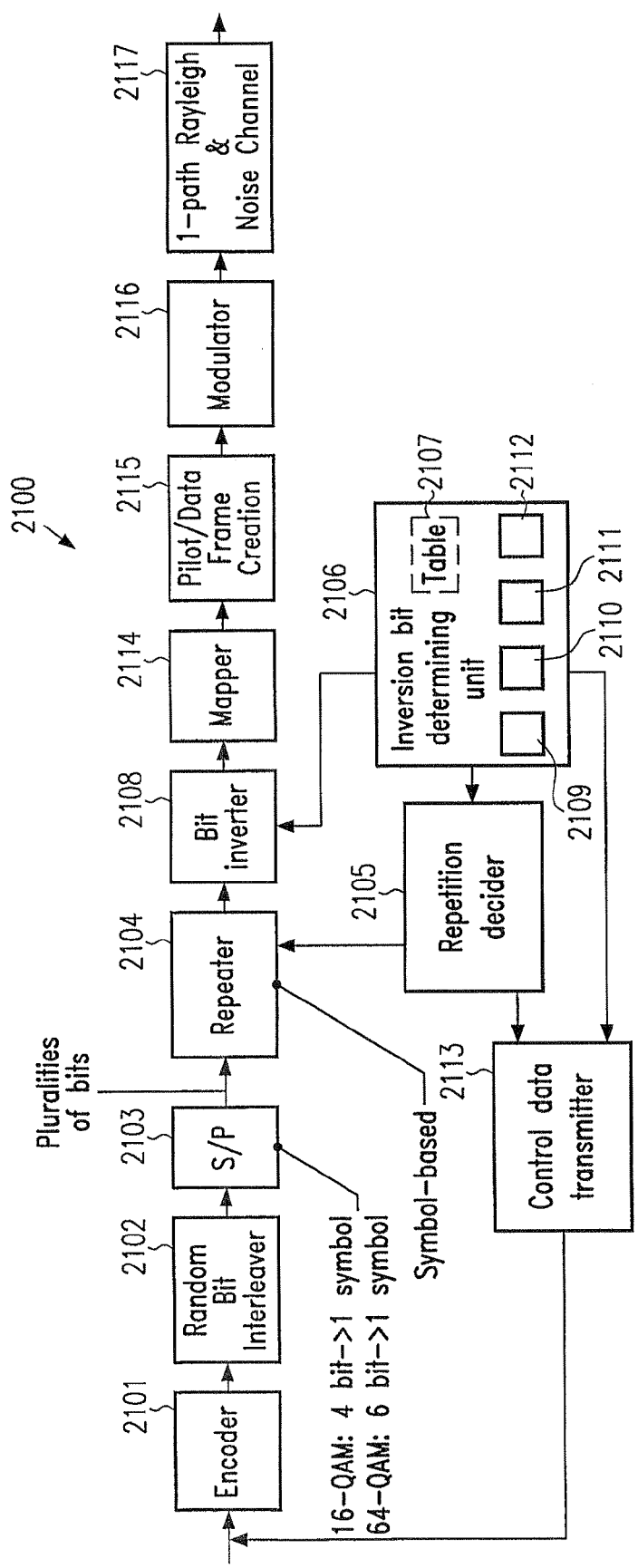
FIG. 21 shows an example of a transmitter chain.

In FIG. 21 a transmitter 2100 is illustrated, which can be used to transmit data according to the method described above.

In the transmitter 2100, a bit stream to be transmitted is encoded in encoder 2101. The encoded bit stream is interleaved in random bit interleaver 2102. In S/P unit 2103, groups of bits are combined into bit sequences (pluralities of bits) which are later represented by one transmitted symbol. The number of bits to be combined depends on the number of modulation states available. For example, for 16-QAM ld 16=4 bit are combined into one sequence, for 64-QAM ld 64=6 bit are combined into one symbol. In repeater 2104, symbols are repeated for re-transmission. The repetition factor and the ratio of symbols to be repeated is depending on the particular version of the method. This is controlled by repetition decider 2105. Inversion bit determining unit 2106, which may comprise a memory 2107 for storing a table containing bit inversion information, determines particular bits of repeated bit sequences to be inverted in the selective bit inverter 2108, depending on the modulation scheme as described above. The bits may be determined for inversion based on information received from a peer entity, by carrying out respective algorithms or by reading stored information from a memory. Inversion bit determining unit 2106 may further comprise sub-units (2109-2112) carrying out sub-steps of the methods for determining the sub-set(s) of bits for inversion as described above. Transmitter 2100 may further comprise a control data transmitter 2113 transmitting information about repetition of bit sequences and about inverted bits via the same or another transmission channel.

Mapper 2114 maps symbols, representing one bit sequence each, to modulation states using a mapping which is invariant at least between transmission of a symbol and re-transmission of the same symbol with a part of the bits inverted, like described above.

After the mapping, pilot data is added and frames are combined in Pilot/Data frame creation unit 2115 before the information is modulated onto a carrier in modulator 2116. The modulated signal is sent to a receiving entity via channel 2117.

Depending on the particular implementation, transmitter 2100 may comprise further units like IF stage, mixers, power amplifier or antenna. From a signal flow point of view, such units might also be seen comprised in channel 2117, as they all may add noise to the signal or exert phase shift or attenuation on the signal.

Units 2101 to 2116 may be implemented in dedicated hardware or in a digital signal processor. In this case the processor performs the method described herein by executing instructions read from a computer-readable storage medium like read-only memory, electrically erasable read-only memory or flash memory. These instructions may further be stored on other computer-readable media like magnetic disc, optical disc or magnetic tape to be downloaded into a device before it is brought to use. Also mixed hardware and software embodiments are possible.

Figure 22:
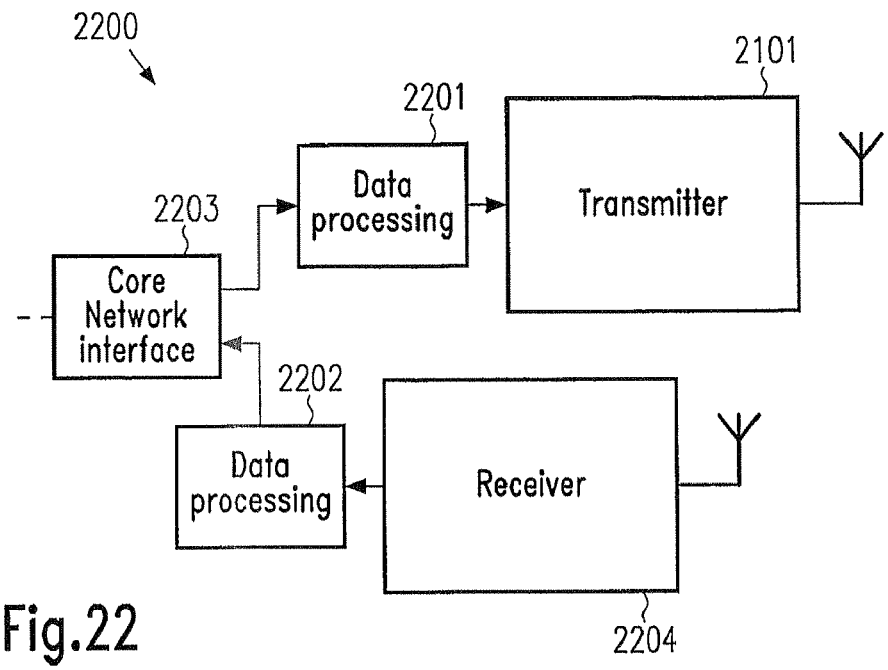
FIG. 22 illustrates an exemplary structure of a base station.
Figure 23:
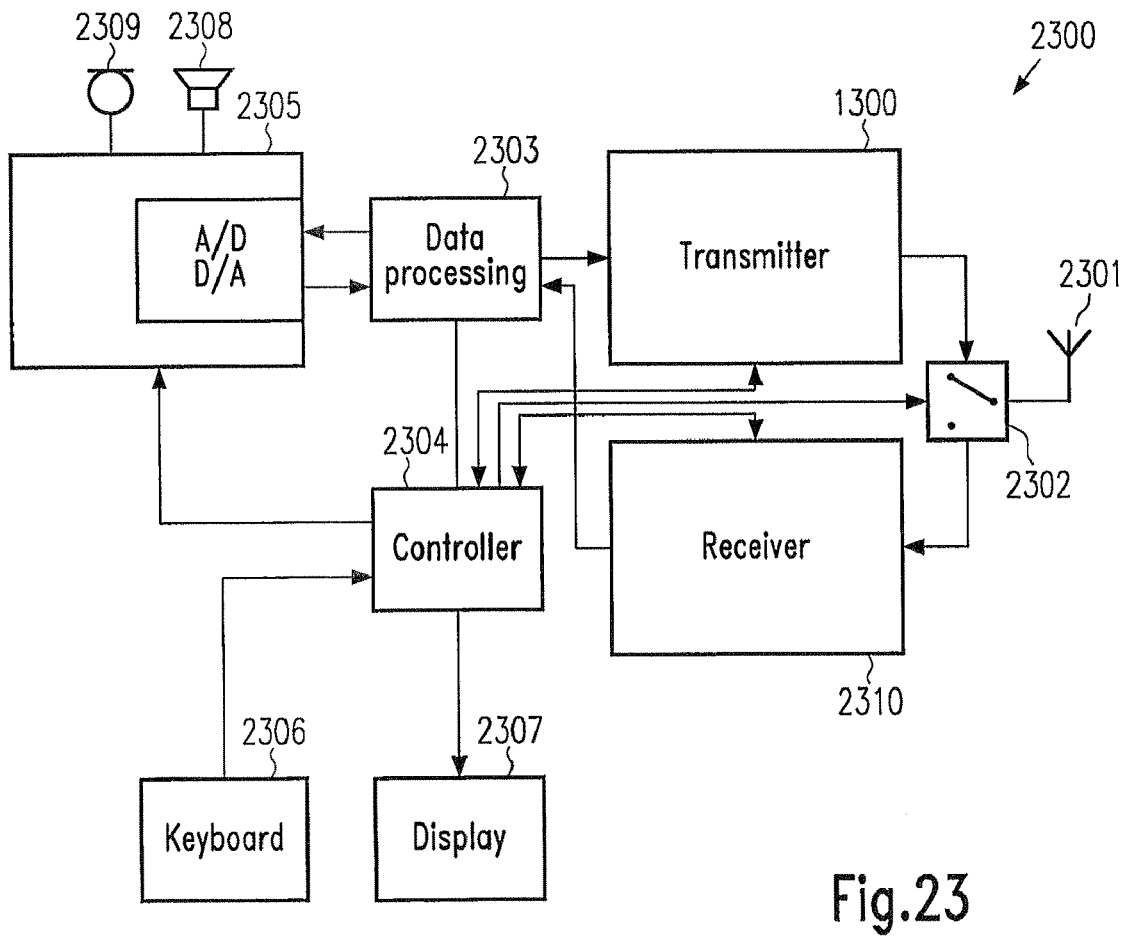
FIG. 23 illustrates an exemplary structure of a mobile station.

Transmitter 2100 may be part of a base station 2200 as shown in FIG. 22. Such a base station may further comprise data processing units 2201 and 2202, a core network interface 2203 and a corresponding receiver 2204.

A counterpart to base station 1900 might be a mobile station 2300 as shown in FIG. 20. Besides transmitter 2001 and receiver 2310, a mobile station may further comprise antenna 2301, antenna switch 2302, data processing unit 2303 and controller 2304.

Mobile station 2300 might be a mobile phone or a module to be integrated into a portable computer, PDA, vehicle, vending machine or the like. A mobile phone may further comprise mixed signal unit 2305 and a user interface comprising keyboard 2306, display 2307, speaker 2308 and microphone 2309.

Embodiments of the present invention reduce the number of ambiguities when the original and the one or more counterpart symbol(s) are combined. This reduced number of ambiguities facilitates a better channel estimation, less dependent on or independent of the actual data symbol transmitted. A better channel estimation, in turn, leads to lower bit error rates.

As a further benefit, the resultant rearrangement has benevolent effect on the bit reliabilities similar to prior art Constellation rearrangement when the log likelihood ratios of the bits are combined in the demodulator.

While the invention has been described with respect to the embodiments constructed in accordance therewith, it will be apparent to those skilled in the art that various modifications, variations and improvements of the present invention may be made in the light of the above teachings and within the purview of the appended claims without departing from the spirit and intended scope of the invention. In addition, those areas in which it is believed that those of ordinary skill in the art are familiar, have not been described herein in order to not unnecessarily obscure the invention described herein. Accordingly, it is to be understood that the invention is not to be limited by the specific illustrative embodiments, but only by the scope of the appended claims.

The invention claimed is:

1. A method for transmitting signals in a digital communication system, said method comprising:
  a) a first mapping step comprising mapping a first plurality of bits to a first modulation state according to a Gray mapping of bit sequences to modulation states;
  b) a transmission step comprising transmitting said first plurality of bits by modulating a carrier according to said first modulation state;
  c) at least one inverting step, each at least one inverting step comprising obtaining at least one further plurality of bits by inverting bits of one subset of said first plurality of bits and keeping bits not comprised within said subset unchanged;

d) at least one further mapping step comprising mapping said at least one further plurality of bits to at least one further modulation state according to said Gray mapping of bit sequences to modulation states;

e) at least one re-transmission step comprising re-transmitting said first plurality of bits by modulating the carrier according to said at least one further modulation state, wherein in step c) each inverting step inverts all bits comprised within said subset of said first plurality of bits such that a number of different vector sum results obtainable, for all combinations of bit values within said first plurality of bits, by adding vectors representing complex values of said first and at least one further modulation states in a complex plane, is lower than a number of different modulation states within said Gray mapping of binary numbers to modulation states, wherein said number of different vector sum results obtainable, for all combinations of bit values within said first plurality of bits, by adding vectors representing complex amplitudes of said first and at least one further modulation states in a complex plane, is greater than two, wherein said Gray mapping defines modulation states of a mixed modulation comprising amplitude shift key modulation and phase shift key modulation, and said first plurality of bits comprises an amplitude shift key set defining an absolute value of a complex value of a modulation state associated with said plurality of bits within said Gray mapping and a phase shift key set defining a phase value of a complex value of a modulation state associated with said plurality of bits within said Gray mapping wherein step c further comprises:

i. at least one first inverting sub-step, carried out on the amplitude shift key set, wherein in said at least one first inverting sub-step:

n is a natural number, wherein the number of different combinations of bit values within said first plurality of bits is $2^n$;

k is a natural number, wherein said number of different vector sum results obtainable, for all combinations of bit values within said first plurality of bits, by adding vectors representing complex values of said first and further modulation states in a complex plane is $2^k$;

said Gray mapping defines modulation states of an amplitude shift key modulation; and step c) inverts a bit which has a first identical value for the $2^{n-k-1}$ of all pluralities of bits which are mapped to modulation states having the lowest transmission power of all existing modulation states and a value opposite to the first value for the next modulation state with the next higher transmission power value, or step c) inverts a bit which has a first identical value for the $2^{n-k-1}$ of all pluralities of bits which are mapped to modulation states having the highest transmission power of all existing modulation states and a value opposite to the first value for the next modulation state with the next lower transmission power value; or ii. at least one second inverting sub-step, carried out on the phase shift key set, wherein in said at least one second inverting sub-step, each step c) inverts all bits comprised within a subset of said first plurality of bits, said subset being a subset of the set of combinations from one to all but one of said first plurality of bits.

2. The method of claim 1, wherein said Gray mapping defines modulation states of a amplitude shift key modulation, and step c) inverts all bits comprised within one subset of said first plurality of bits, said subset consisting of a bit which has an identical value for half of all pluralities of bits which are mapped to modulation states having the lowest transmission power of all existing modulation states, or step c) inverts all bits comprised within one subset of said first plurality of bits, said subset consisting of a bit which has an identical value for half of all pluralities of bits which are mapped to modulation states having the highest transmission power of all existing modulation states.

3. The method of claim 1, wherein each step c) inverts all bits comprised within a subset of said first plurality of bits, said subset being a subset of the set of combinations from one to all but one of said first plurality of bits.

4. The method of claim 3, wherein said Gray mapping defines modulation states of a phase shift key modulation.

5. The method of claim 1, wherein said Gray mapping defines modulation states of a mixed modulation comprising amplitude shift key modulation and phase shift key modulation, and said first plurality of bits comprises an amplitude shift key set defining an absolute value of a complex value of a modulation state associated with said plurality of bits within said Gray mapping and a phase shift key set defining a phase value of a complex value of a modulation state associated with said plurality of bits within said Gray mapping, step c) comprising i. at least one inverting sub-step as defined in claim 2, carried out on the amplitude shift key set; or ii, at least one inverting sub-step as defined in claim 3, carried out on the phase shift key set.

6. The method of claim 1, wherein said Gray mapping defines a modulation comprising a first component and a second component, said second component being essentially orthogonal to said first component, and wherein said first plurality of bits comprises a first bit set associated with said first component according to a second Gray mapping of bit sequences to a first set of modulation states, and a second bit set associated with said second component according to a third Gray mapping of bit sequences to a second set of modulation states, wherein step c) comprises the sub-steps of i. inverting a bit comprised within said first bit set, said bit having an identical value for half of all pluralities of bits which are mapped to modulation states having the lowest transmission power of all existing modulation states within said first set of modulation states according to said second Gray mapping; or inverting a bit comprised within said first bit set, said bit having an identical value for half of all pluralities of bits which are mapped to modulation states having highest transmission power of all existing modulation states within said first set of modulation states according to said second Gray mapping; and ii. inverting a bit comprised within said second bit set, said bit having an identical value for all pluralities of bits which are mapped to said second set of modulation states having an identical sign of said second component of said complex value of said second set of modulation states associated with said plurality of bits within said third Gray mapping.

7. The method of claim 6, wherein said modulation is a square quadrature amplitude modulation.

8. The method according to claim 1, wherein said Gray mapping defines a modulation comprising a first component and a second component, said second component being essentially orthogonal to said first component, and wherein said first plurality of bits comprises a first bit set associated with said first component according to a second Gray mapping of bit sequences to a first set of modulation states, and a second bit set associated with said second component according to a third Gray mapping of bit sequences to a second set of modulation states, wherein the number of different combinations of bit values within said first plurality of bits is $2^n$;

step c) comprises the sub-steps of i. inverting a bit comprised within the first set, said bit having a first identical value for the $2^{n-k-1}$, $0 \leq k \leq n$, of all pluralities of bits which are mapped to modulation states having the lowest transmission power of all existing modulation states within said first set of modulation states and a value opposite to the first value for the next modulation state within said first set of modulation states with the next higher transmission power value, or inverting a bit comprised within the first set, said bit having a first identical value for the $2^{n-k-1}$, $0 \leq k \leq n$, of all pluralities of bits which are mapped to modulation states having the highest transmission power of all existing modulation states within said first set of modulation states and a value opposite to the first value for the next modulation state within said fist set of modulation states with the next lower transmission power value;

wherein a number of different vector sum results obtainable, for all combinations of bit values within said first set of bits, by adding vectors representing complex values of said first set of modulation states in a complex plane is $2^k$; or ii. inverting a bit comprised within the second set, said bit having a first identical value for the $2^{n-j-1}$, $0 \leq j \leq n$, of all pluralities of bits which are mapped to modulation states having the lowest transmission power of all existing modulation states within said second set of modulation states and a value opposite to the first value for the next modulation state within said second set of modulation states with the next higher transmission power value, or inverting a bit comprised within the second set, said bit having a first identical value for the $2^{n-j-1}$, $0 \leq j \leq n$, of all pluralities of bits which are mapped to modulation states having the highest transmission power of all existing modulation states within said second set of modulation states and a value opposite to the first value for the next modulation state within said second set of modulation states with the next lower in-phase component transmission power value;

wherein a number of different vector sum results obtainable, for all combinations of bit values within said second set of bits, by adding vectors representing complex values of said second set of modulation states in a complex plane is $2^j$.

9. The method according to claim 1, wherein said transmitting steps are carried out subsequently on the same transmission channel.

10. The method according to claim 1, wherein said digital communication system comprises a frequency division multiple access component, and said transmitting steps are carried out in different frequency channels.

11. The method according to claim 1, wherein said transmission steps are applied to each transmitted symbol.

12. The method according to claims 1, wherein second and further transmission steps are applied to a defined number of symbols per transmission frame.

13. The method of claim 1, wherein when step c) comprises performing said at least one second inverting sub-step, said Gray mapping defines modulation states of a phase shift key modulation.

14. A computer-readable storage medium having stored thereon program instructions that, when executed in a processor of a transmitter of a digital communication system, cause the transmitter to perform the method according to claim 1.

15. A transmitter for a digital communication system, the transmitter comprising:

a repeater to receive a first plurality of bits and to repeat the received first plurality of bits at least once;

an inversion bit determining unit to determine, for the at least one repeated instance of said first plurality of bits, a subset of bits for inversion;

a bit inverter to invert all bits of said at least one repeated instance which are comprised within said sub-set determined for said at least one repeated instance, to obtain at least one further plurality of bits comprising said inverted bits and all un-inverted bits of said first plurality of bits;

a mapper to map said first and further pluralities of bits to first and further modulation states according to a Gray mapping;

a modulator to modulate a carrier according to the modulation states, wherein said inversion bit determining unit is configured to determine said at least one subset of said first plurality of bits for inversion such that a number of different vector sum results obtainable, for all combinations of bit values within said first plurality of bits, by adding vectors representing complex values of said first and further modulation states in a complex plane is lower than a number of different modulation states within said Gray mapping of binary numbers to modulation states, wherein said number of different vector sum results obtainable, for all combinations of bit values within said first plurality of bits, by adding vectors representing complex amplitudes of said first and at least one further modulation states in a complex plane, is greater than two, and wherein said Gray mapping defines modulation states of a mixed modulation comprising amplitude shift key modulation and phase shift key modulation, and said first plurality of bits comprises an amplitude shift key set defining an absolute value of a complex value of a modulation state associated with said plurality of bits within said Gray mapping and a phase shift key set defining a phase value of a complex value of a modulation state associated with said plurality of bits within said Gray mapping, said bit inverter being further configured to perform:

i. at least one first inverting sub-step, carried out on the amplitude shift key set, wherein in said at least one first inverting sub-step:

n is a natural number, wherein the number of different combinations of bit values within said first plurality of bits is $2^n$;

k is a natural number, wherein said number of different vector sum results obtainable, for all combinations of bit values within said first plurality of bits, by adding vectors representing complex values of said first and further modulation states in a complex plane is $2^k$;

said Gray mapping defines modulation states of an amplitude shift key modulation;

said bit inverter inverts a bit which has a first identical value for the $2^{n-k-1}$ of all pluralities of bits which are mapped to modulation states having the lowest transmission power of all existing modulation states and a value opposite to the first value for the next modulation state with the next higher transmission power value, or said bit inverter inverts a bit which has a first identical value for the $2^{n-k-1}$ of all pluralities of bits which are mapped to modulation states having the highest transmission power of all existing modulation states and a value opposite to the first value for the next modulation state with the next lower transmission power value; or ii. at least one second inverting sub-step, carried out on the phase shift key set, wherein in said at least one second inverting sub-step, said bit inverter inverts all bits comprised within a subset of said first plurality of bits, said subset being a subset of the set of combinations from one to all but one of said first plurality of bits.

16. The transmitter according to claim 15, wherein said inversion bit determining unit comprises storage means for storing thereon information, identifying said at least one subset of said first plurality of bits for inversion, in a look-up table.

17. The transmitter according to claim 15, further comprising repetition decision means for controlling the repeater according to a decision about whether a plurality of bits should be repeated or not, based on a position of said plurality of bits within a frame.

18. The transmitter according to claim 15, further comprising control data transmission means configured for transmitting information identifying said at least one subset of said first plurality of bits for inversion or information about positions of repeated symbols within a frame.

19. A base station of a digital wireless communication system comprising the transmitter according to claim 15.

20. A mobile station of a digital wireless communication system comprising the transmitter according to claim 15.

* * * * *